United States Patent [19]
Nowatzyk et al.

[11] Patent Number: 6,081,844
[45] Date of Patent: *Jun. 27, 2000

[54] POINT-TO-POINT INTERCONNECT COMMUNICATIONS UTILITY

[75] Inventors: Andreas G. Nowatzyk, Mountain View; Michael W. Parkin, Palo Alto, both of Calif.

[73] Assignee: Sun Microsystems, Inc., Mountain View, Calif.

[ * ] Notice: This patent is subject to a terminal disclaimer.

[21] Appl. No.: 09/013,484

[22] Filed: Jan. 26, 1998

Related U.S. Application Data

[63] Continuation of application No. 08/632,312, Apr. 15, 1996, Pat. No. 5,754,789, which is a continuation of application No. 08/101,839, Aug. 4, 1993, abandoned.

[51] Int. Cl.[7] .................................................. G06F 15/173
[52] U.S. Cl. ......................... 709/233; 709/228; 709/237; 709/248; 714/12
[58] Field of Search ..................... 709/233, 237, 709/238, 248, 228; 714/12

[56] References Cited

U.S. PATENT DOCUMENTS

| | | | |
|---|---|---|---|
| 4,726,019 | 2/1988 | Adelmann et al. | 370/474 |
| 4,763,318 | 8/1988 | Westbrook et al. | 370/494 |
| 4,769,815 | 9/1988 | Hinch et al. | 370/326 |
| 4,901,277 | 2/1990 | Soloway et al. | 709/233 |
| 5,138,615 | 8/1992 | Lamport et al. | 370/400 |
| 5,166,927 | 11/1992 | Iida et al. | 370/238 |
| 5,193,151 | 3/1993 | Jain | 709/237 |
| 5,235,595 | 8/1993 | O'Dowd | 370/392 |
| 5,235,599 | 8/1993 | Nishimura et al. | 714/4 |
| 5,247,616 | 9/1993 | Berggren | 709/212 |
| 5,274,631 | 12/1993 | Bhardwaj | 370/401 |
| 5,327,428 | 7/1994 | Van As et al. | 370/353 |
| 5,379,280 | 1/1995 | Cotton et al. | 370/268 |
| 5,500,860 | 3/1996 | Perlman et al. | 370/401 |
| 5,506,846 | 4/1996 | Edem et al. | 370/396 |
| 5,754,789 | 5/1998 | Nowatzyk et al. | 709/233 |

OTHER PUBLICATIONS

*A CommunicationsArchitecture for Multiprocessor Networks*, Nowatzyk, G., Ph.D. dissertation, Carnegie Mellon University, Dec. 1989, 246 pages, (see chapter 3, p. 57).

*Primary Examiner*—John A. Follansbee
*Attorney, Agent, or Firm*—Blakely Sokoloff Taylor & Zafman

[57] ABSTRACT

An interconnect controller for use in an arbitrary topology collection of nodes in a network suitable for use for both data sharing and distributed computing. The interconnect controller provides four (4) serial ports and two (2) parallel ports for communicating with adjacent nodes in a network. Linked ports between two nodes provide a continuous stream of information with idle packets filling non-data transfer cases. The logic of the interconnect controller provides for adaptive routing and to topology independence and allows for the sharing of a common clock for synchronizing the packet transmission.

33 Claims, 18 Drawing Sheets

POINT-TO-POINT INTERCONNECT COMMUNICATIONS UTILITY

This application is a continuation of 08/632,312, filed Apr. 15, 1996, now U.S. Pat. No. 5,754,789, which is a continuation of 08/101,839 filed Aug. 4, 1993, now abandoned.

BACKGROUND OF THE INVENTION

1. Field of the Invention

The present invention relates generally to communications between computers. More particularly, the present invention relates to point-to-point interconnect communications technologies for use in an arbitrarily assembled computer network.

2. Description of Related Art

The evolution of computer technology has seen the progression from huge room-sized collections of tubes to desktop and even hand-held size machines supported by millions of tiny transistors. Throughout much of this evolution the focus has been on increasing the power and speed of single autonomous machines. This has led to today's stand-alone machines which have awesome computational and data processing power.

Relatively recent efforts in the computer field have been directed toward the sharing of data from more than one computer station. Other efforts have been directed toward the use of multiple processors in a single computer to enhance the speed and power of single machines.

Current research has been directed toward combining the above efforts to yield powerful computer systems composed of a plurality of otherwise stand-alone machines. For some time, high speed local area networks have been used to link many computers to facilitate data transfer between multiple autonomous units. Modern offices use such networks to greatly increase the movement of information between users without increasing the use of paper. Similarly, such networks provide alternative communication mechanisms between the network's users in the form of electronic mail and the provision of public forums for common discussion.

A network utilizing an efficient communications protocol may be used for both data sharing and for implementing the concept of a Distributed Shared Memory System (DSM). Unlike a local area network which is motivated by the need to share data, a DSM is motivated by combining multiple processors into one large system with the potential for using the aggregate resources for any given application. A number of different methods have been explored for sharing computer resources in a given network collection.

Whether a network is assembled purely to serve a network function of sharing data or the more complex case of combining computing resources, it is essential that information from any one system in the network be able to be conveyed to any other system in the network. There have been many protocols developed for different implementations many utilizing a centralized switch. Most have required a priori defined locations and addresses for each member of the network, or nodes. (Note that a given system in a network may in some cases house more than one node.) This predefined nature of the network impedes the ease with which additional elements may be added or existing nodes removed.

Other problems to contend with include the need to prioritize certain types of data transfers. Isochronous data transfers for real-time information such as video and sound may not be unduly delayed and must be delivered in sequential order. Other information such as routine data file information may be conveyed piecemeal with errors corrected out of sequence. These problems are further complicated in networks utilizing a common bus which must be arbitrated for, which arbitration may become overly burdensome with an increased number of nodes in the system. Finally, reconciling the differing needs of local area network communications and DSM communication into a single protocol has heretofore provided a daunting task.

In his Ph.D. dissertation, Communications Architecture for Multi-Processor Net works, at Carnegie Mellon University, Andreas G. Nowatzyk, one of the inventors of the present invention describes a theoretical implementation of a distributed shared memory system. That dissertation is incorporated herein by references.

SUMMARY OF THE INVENTION

In light of the foregoing, it can be appreciated that there is a need for a method and apparatus for the efficient transmission of data between nodes in a network suitable for use in a wide range of communications activities. It is therefore, an object of the present invention to provide a method and apparatus for conveying information between nodes in a given network of nodes suitable for use in both traditional data sharing network operation as well as for more traffic-intensive shared-memory type applications.

It is also an object of the present invention to provide an interconnect technology based on a distributed switch concept to provide a flexibly expandable network.

Another object of the present invention is to provide a data packet routing mechanism which is independent of the topology of the graph, thus providing for an arbitrary topology network.

It is also an object of the present invention to provide a message routing mechanism utilizing a common buffer pool for the deposit and receipt of information packets for use by all ports of a communications node.

It is another object of the present invention to provide priorities for data packets thus enabling Isochronous data transfers for real-time information.

Another object of the present invention is to provide a temporal alignment buffer to provide an adjustment in the round-trip delay for packets between given nodes thus ensuring an integral multiple of packet transmission times between two nodes.

It is another object of the present invention to provide a distributed phase-locked loop between nodes in a given network to provide for the synchronization of packet transmissions between nodes.

It is also an object of the present invention to provide a method of initializing a network to determine round-trip delays between adjacent nodes as well as breaking cycles to avoid deadlock situations.

Yet another object of the present invention is to provide an adaptive routing mechanism to increase the efficiency of packet transmissions between non-adjacent nodes in a network.

These and other objects of the present invention are provided by an interconnect controller which facilitates communications between given nodes in a network. The interconnect controller comprises four (4) serial ports and two (2) parallel ports. Each serial port has channel module logic circuitry for conveying signals between a corresponding channel module on an adjacent node. Information is conveyed between nodes over links in a conveyor belt fashion with idle packets being inserted when no other information is being transferred. The delay time in transmission is adjusted by a temporal alignment buffer in the channel modules to ensure that an integral multiple of packet transmission times are used for the total delay time thus providing a mechanism for predicting the arrival and start of each packet transmission. The four channel modules on a single interconnect controller chip share a common buffer pool with linked list entries for identifying which channel module is to propagate each received packet. The common buffer pool is segmented into sixteen (16) bit segments so that received packets may begin retransmission before completing arrival. This also eliminates extra registers which otherwise would be required to convert to an 80-bit parallel interface. In addition to data, data packets include information about packets including destination and error correction information as well as prefix bits identifying acknowledgments and other control information.

The interconnect controller of the present invention includes a routing table that is filled during network initialization so that when an incoming packet identifies its destination, that destination can be looked up in the routing table to determine which channel module and output port to use for continuing the packet on its way. When more than one output channel may be used, the interconnect controller logic will determine the channel with least traffic thus providing an adaptive routing mechanism to increase the efficiency of the interconnect system. The routing table used also provides for the assembly of an arbitrary topology graph which may receive new nodes during operation of the system.

The parallel ports of the interconnect controller may be used to link the interconnect controller to a local host as well as to one or two other interconnect controller chips thus providing for a switch with up to twelve (12) serial output channels at a given node.

The channel module logic circuitry of the interconnect controller provides for a distributed phase-locked loop mechanism as well as a clock information sharing mechanism.

Data packets comprise 80-bit words which can be combined into quad packets for the conveyance of 32-byte line cache-size words. The channel modules may also include serializers and deserializers for the processing of data. Virtual channels are implemented to eliminate deadlock problems. Each point-to-point channel has a Master/Slavebit, which is set during initialization such that each end can identify itself as either a Master or Slave in a consistent manner. This Master/Slave bit can be used during the network exploration phase to break symmetrics. The Master/Slave bit is also needed during the probabilistic start-up protocol that establishes round-trip delay and word alignment. Each virtual channel is provided with its own set of input buffers to eliminate deadlock situations.

BRIEF DESCRIPTION OF THE DRAWINGS

The objects, features and advantages of the present invention will be apparent from the following detailed description in which.

DETAILED DESCRIPTION OF THE INVENTION

An apparatus and a number of methods are described for use in a communications protocol between nodes in an arbitrary topology network. In the following description, numerous specific details are set forth such as data packet lengths and priority types in order to provide a thorough understanding of the present invention. It will be obvious, however, to one skilled in the art that the present invention may be practiced without such specific details. In other instances, well-known control structures and gate level circuits have not been shown in detail in order not to obscure unnecessarily the present invention. Particularly, many functions are described to be carried out by various logic circuits. Those of ordinary skill in the art, having been described the various functions, will be able to implement the necessary logic without undue experimentation.

Overview of the Computer System Incorporating the Present Invention

Figure 1:
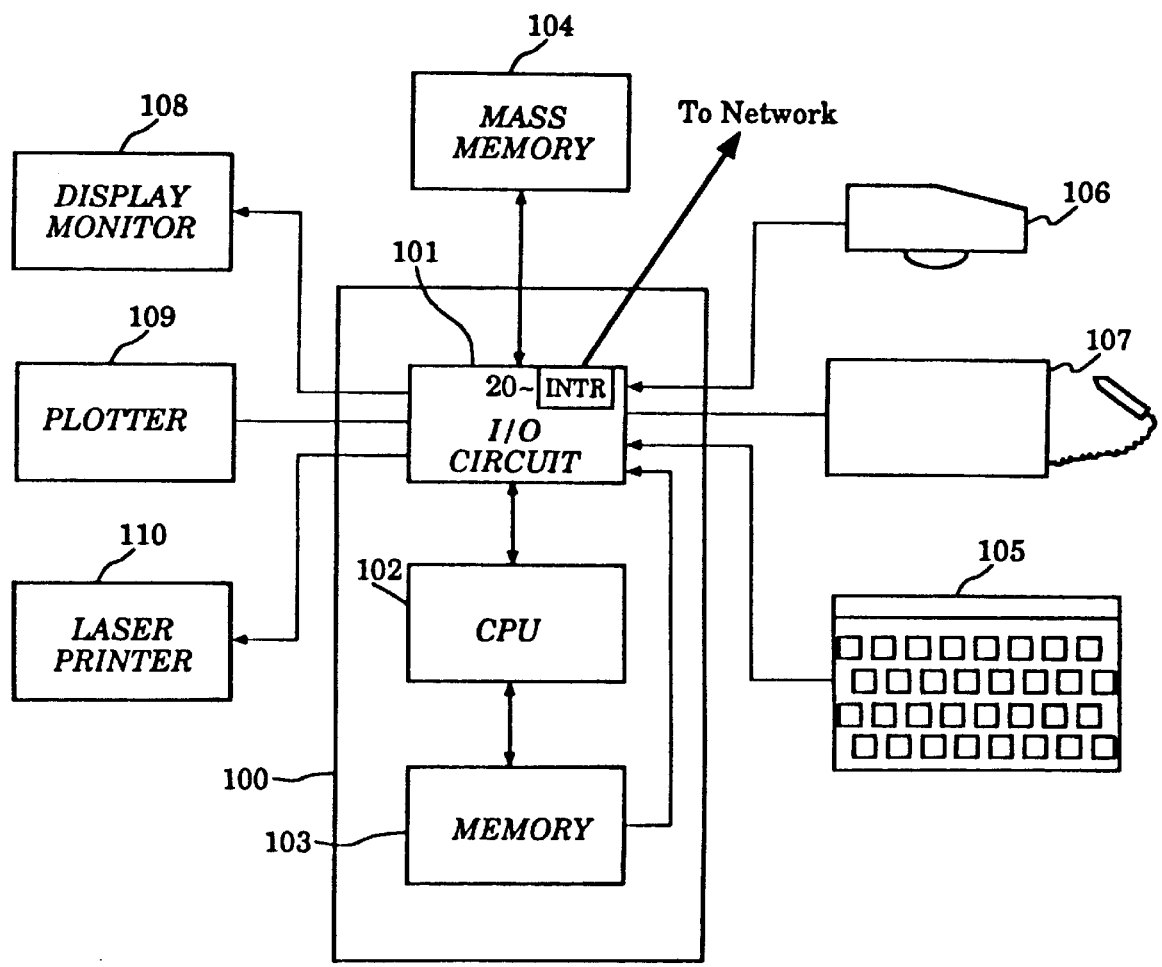
FIG. 1 illustrates a basic computer architecture which may utilize the interconnect controller of the present invention.

Referring first to FIG. 1, a typical computer system for use in a data sharing or resource sharing network is illustrated. While the nodes in a network need not be a computer station in all instances, a computer is used for illustrative purposes in describing the interaction of a local host with the interconnect controller of the present invention. Some nodes in a network need not be coupled to any local host and the interconnect controller of the present invention may operate as a switch or be connected to a dumb host such as a graphical display or a printer.

As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor. Particular examples of suitable data processors to fill the role of computer 100 include machines manufactured by Sun Microsystems, Inc., Mountain View, Calif. Other computers having differing capabilities may of course be utilized with the interconnect controller of the present invention.

Also shown in FIG. 1 is an input device 105, shown in a typical embodiment of as a keyboard. There is also shown as an input device a graphics tablet 107. It should be understood, however, that the input device may actually be in any other well-known input device (including, of course, another computer). A mass memory device 104 is coupled to I/O circuit 101 and provides additional storage capabilities for the computer 100. The mass memory may include other programs, fonts for different characters and the like and may take the form of magnetic or optical disc drive or any other well-known device. It will be appreciated that the data retained within mass memory 104, may, in appropriate cases, be incorporated in standard fashion into computer 100 as part of memory 103. As shown in FIG. 1, the interconnect controller 20 of the present invention is incorporated with the I/O circuitry 101 of computer 100.

In addition, three typical computer display devices are illustrated, the display monitor 108, the plotter 109 and a laser printer 110. Each can be used to display images or documents or other data utilized by the computer 100. A cursor control device 106, such as a mouse, trackball or stylus are also coupled to I/O circuit 101. Other pointing devices may suitably be used as appropriate. The interconnect controller 20 of the present invention would in most likely circumstances be coupled to the I/O circuit 101 for providing communications between computer 100 and adjacent nodes on the network though certainly alternative configurations may be appropriate.

Interconnect Controller of the Present Invention

The interconnect controller of the present invention is intended to be the interface between a local host and the interconnect system of a given network. In some cases a given single station/location may comprise more than one network node, having more than one interconnect controller. In other cases, an interconnect controller may be independent of an intelligent local host. The interconnect controller may even stand alone, operating solely as an intermediate switch in a network.

Figure 2:
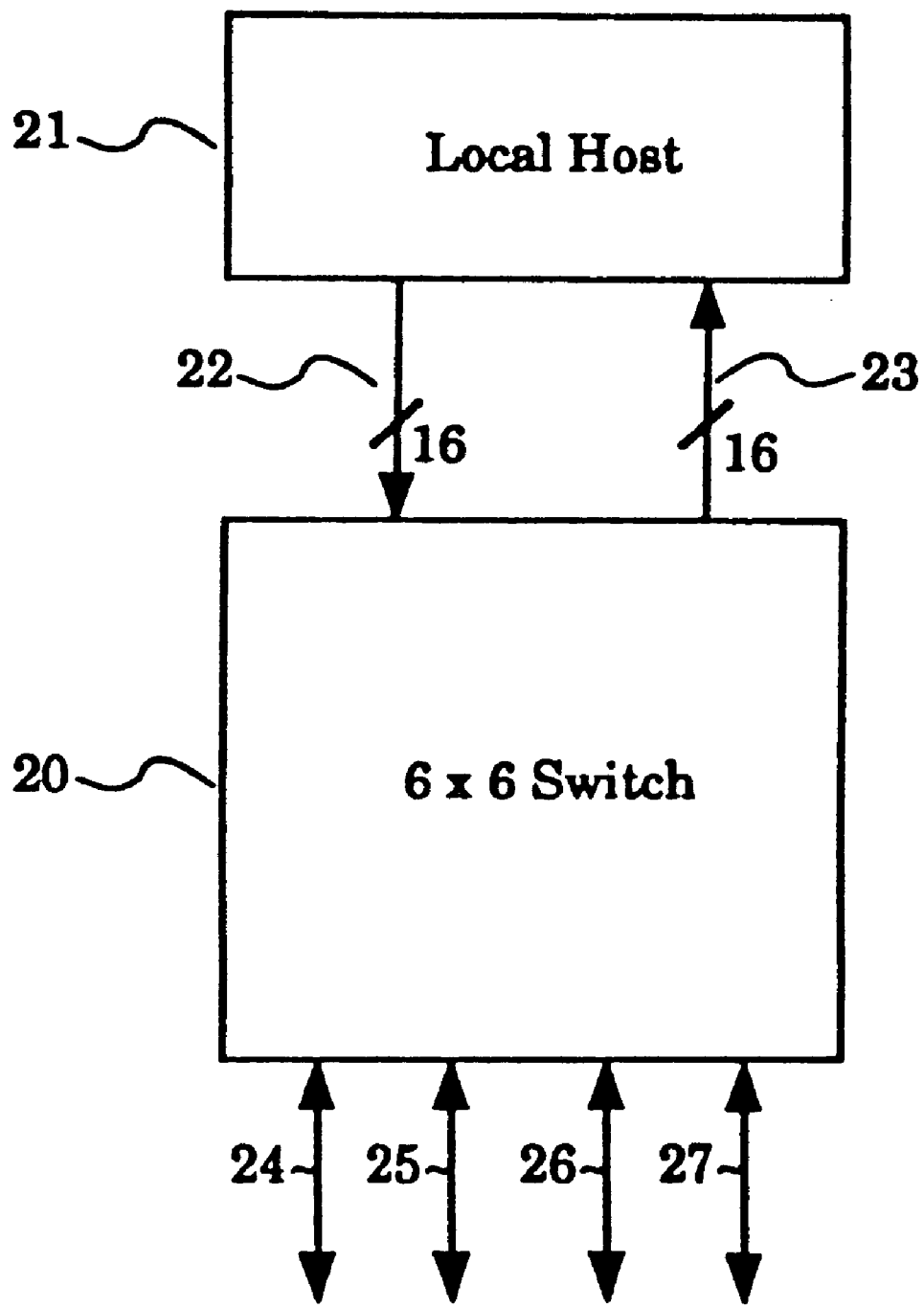
FIG. 2 is a block diagram of the interconnect controller in accordance with the present invention.

FIG. 2 illustrates broadly the interconnect controller 20 of the present invention. In the preferred embodiment the interconnect controller 20 is a 6×6 switch coupled to a local host 21. As described, local host 21 may be a computer work station or some other facility. The local host 21 links to the network via the interconnect controller 20 through the parallel ports 22 and 23. In the preferred embodiment, ports 22 and 23 are 16-bit wide parallel ports. The interconnect controller is also provided with four bi-directional serial ports 24, 25, 26 and 27. Each of these serial ports is used to couple the interconnect controller from a given node to the interconnect controller of an adjacent node. Thus, with a single interconnect controller a node may be serially linked to four other nodes, each of which may be similarly linked to four adjacent nodes.

Figure 3A:
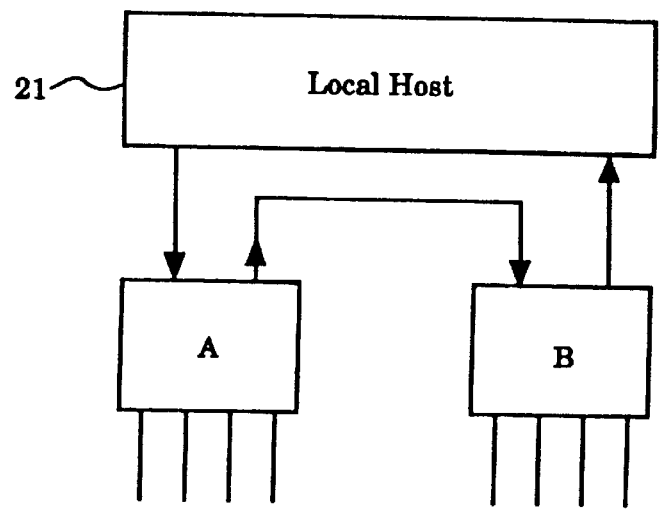
FIG. 3(a)–3(b) illustrate configurations of multiple interconnect controllers to form larger switches in accordance with the present invention.
Figure 3B:
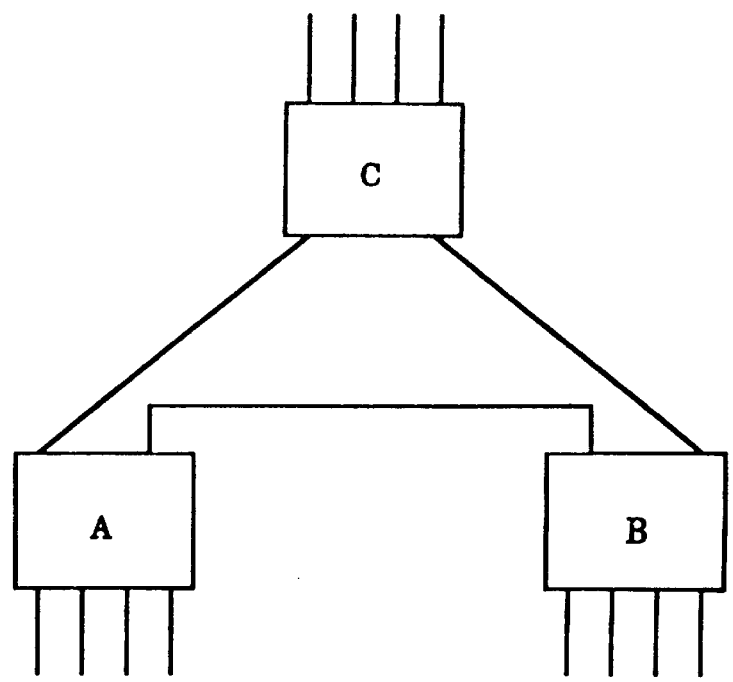

In some situations, it may be desirable for a node to be provided with more than four immediately adjacent nodes to be linked too. FIG. 3(a) illustrates that two interconnect controllers may be coupled through their parallel ports to provide a node with an eight-way switch. FIG. 3(b) illustrates that three (3) interconnect controllers of the present invention may be combined to form a 12-way switch. Such a switch might be useful for forming a star topology graph.

In the typical situation a node will have a single interconnect controller with four external serial ports. Each port may be used to couple the node to an adjacent node through one of its external serial ports. Ports may be coupled via many different media. For distances greater than 10 meters fiber optic cables are best considered. For shorter distances twisted-pair cable or coaxial cable may prove more cost-efficient. Each type of media will require different signal driving circuitry to be incorporated into the interconnect controller. Signal driving circuitry for different communications media are generally well-known in the art and will not be further described herein. Likewise, there are numerous signal encoding and decoding and clock recovery mechanisms for signal propagation that are well-known to those skilled in the art that will not be described herein. Such mechanisms are left to designers to implement as appropriate.

Figure 4:
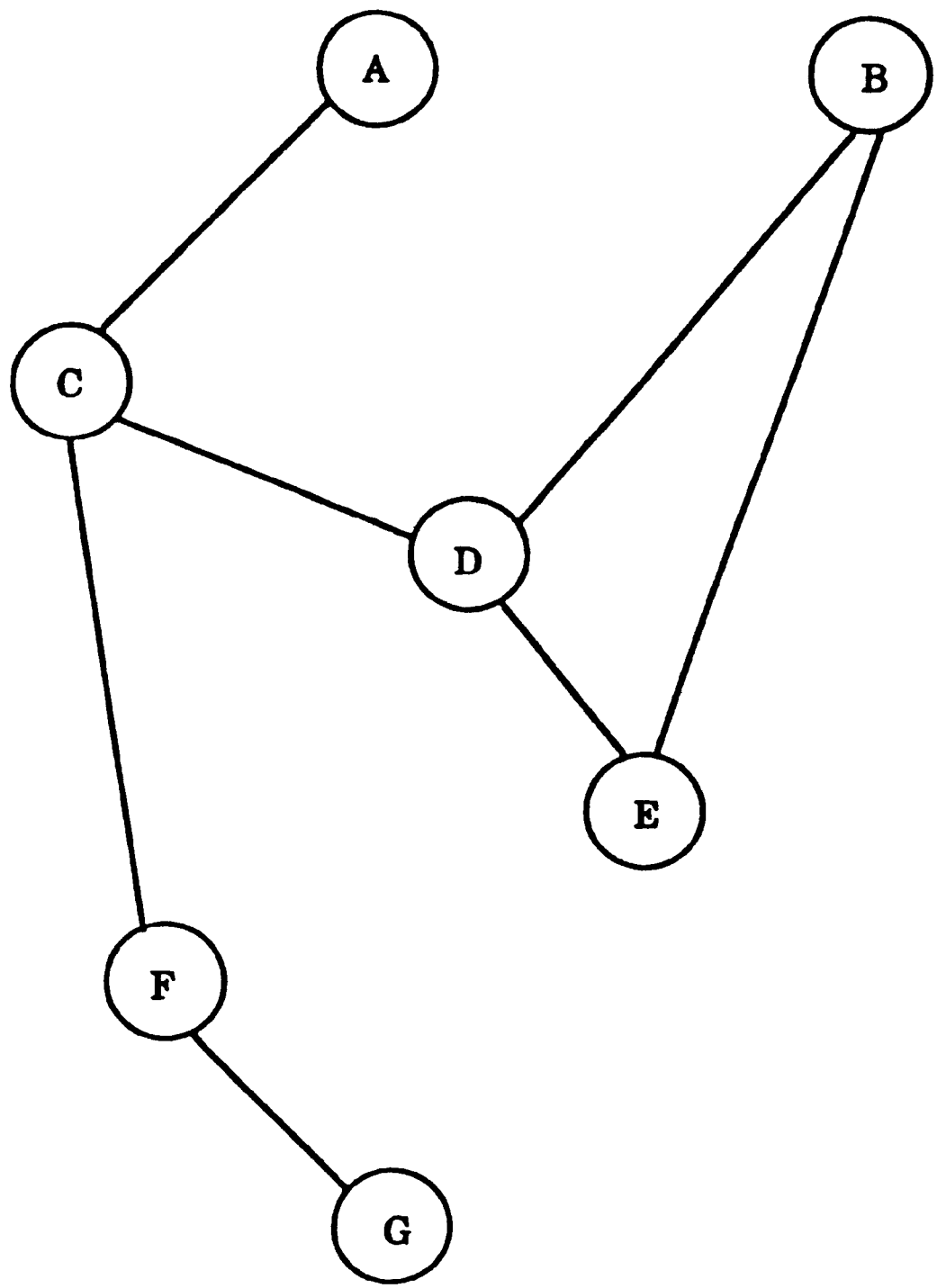
FIG. 4 illustrates an arbitrary topology collection of nodes forming a network.

Before describing in detail the interconnect controller of the present invention, it is useful to describe the overall concept of a decentralized switch network and the format of the data packets exchanged between nodes in accordance with the preferred embodiment of the present invention. FIG. 4 illustrates an arbitrarily configured collection of seven nodes. The dark lines between nodes indicate point-to-point interconnections between nodes, connected to one of the serial ports of the nodes at each terminal end. As can be seen, nodes A and G each have only one adjacent node, nodes B, E and F each have two and nodes C and D each have three. During system initialization the logic associated with each node explores each port to determine the presence of adjacent nodes. Also, during this process the signal round-trip transmission delay time between nodes is calculated for use by the communications protocol. The initialization process and communications protocol will be described in more detail further herein.

During normal operation adjacent nodes continuously exchange data packets over links between corresponding coupled ports. Each data packet is of a fixed length and takes a finite amount of time to propagate toward an adjacent node. The interconnect controller incorporated in each node intelligently adjusts the transmission delay between the adjacent nodes to be equal to an integral number of packet transmission times. The mechanism for adjusting the transmission delay between adjacent nodes is called a temporal alignment buffer and will be described in more detail further herein. Because the transmission delay between adjacent nodes over a given link is equal to an integral multiple of the time for launching a single data packet, each node knows when to expect the header of each of the continuously fed packets supplied to it.

Figure 5:
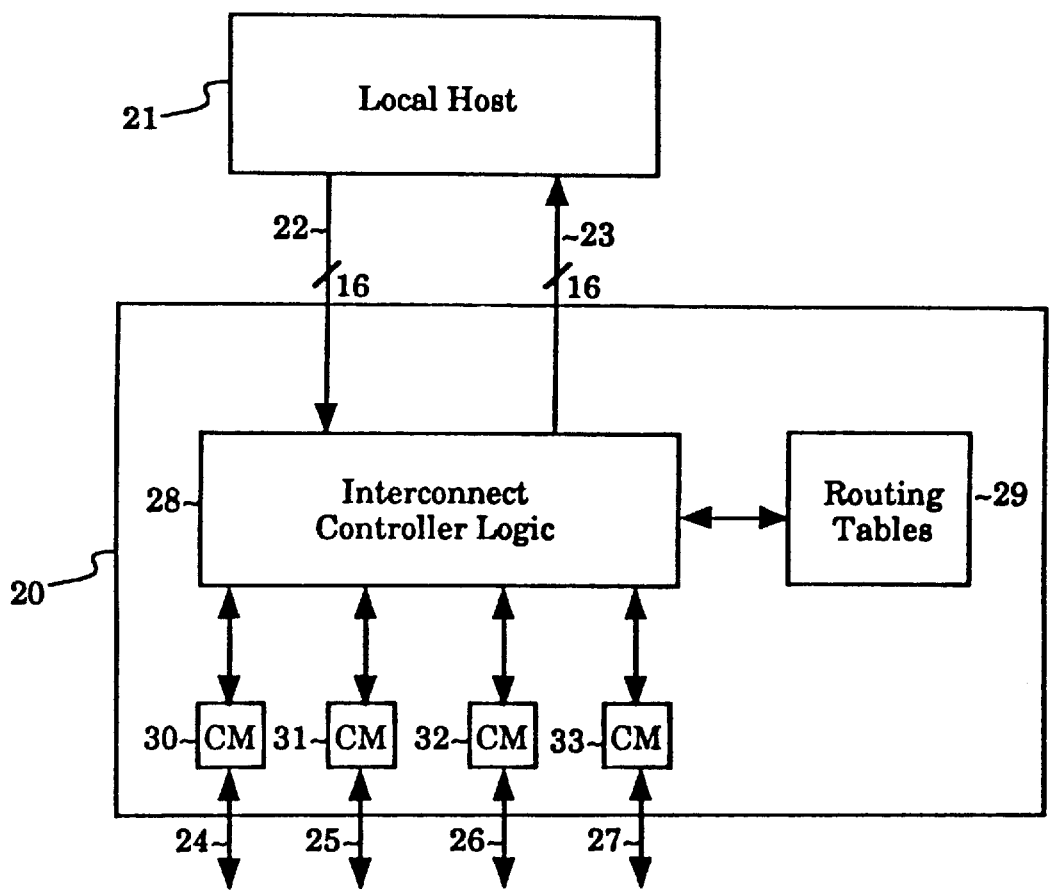
FIG. 5 illustrates a block diagram of the interconnect controller of the present invention.

FIG. 5 illustrates in some more detail the interconnect controller 20 of the present invention. Within the controller is the controller's logic 28 which directs the controller to carry out many of the functions to be described in following sections. The controller 20 also maintains routing table circuitry 29 which is coupled to the controller logic. The routing tables are filled during system initialization and are continuously updated during system operation by background running monitoring routines. There are a number of methods known for computing the routing tables such as those implementing the shortest path solutions suggested by a number of conventional textbooks. The operation of the present invention will be described assuming accurately filled routing tables and continuously updated routing tables based on any of the selected number of known methods. When a data packet is received at a node through one of the node's serial ports it includes information indicating the ultimate destination node for the packet. The routing table for each node maintains information about which port a packet should be transmitted from in order to reach its eventual destination in the most efficient manner.

FIG. 5 also illustrates four channel modules 30, 31, 32 and 33. Each channel module is associated with one of the serial ports and controls the continuous exchange of packets between the node and one adjacent node through the adjacent node's corresponding channel module. The channel modules are responsive to control information that arrives with each packet and maintain tables of information about pending transactions. The channel modules also house the temporal alignment buffer used for adjusting transmission delay times to equal an integral multiple of packet transmission times. Each channel module also includes logic for counting the number of pending transactions over that module. This allows the interconnect controller logic to implement an adaptive routing mechanism. When a packet may be transmitted over alternative channel modules en route to its ultimate destination, the interconnect controller logic is capable of determining which channel module has the least amount of pending traffic thus reducing the total latency for a packet in transit.

Figure 6:
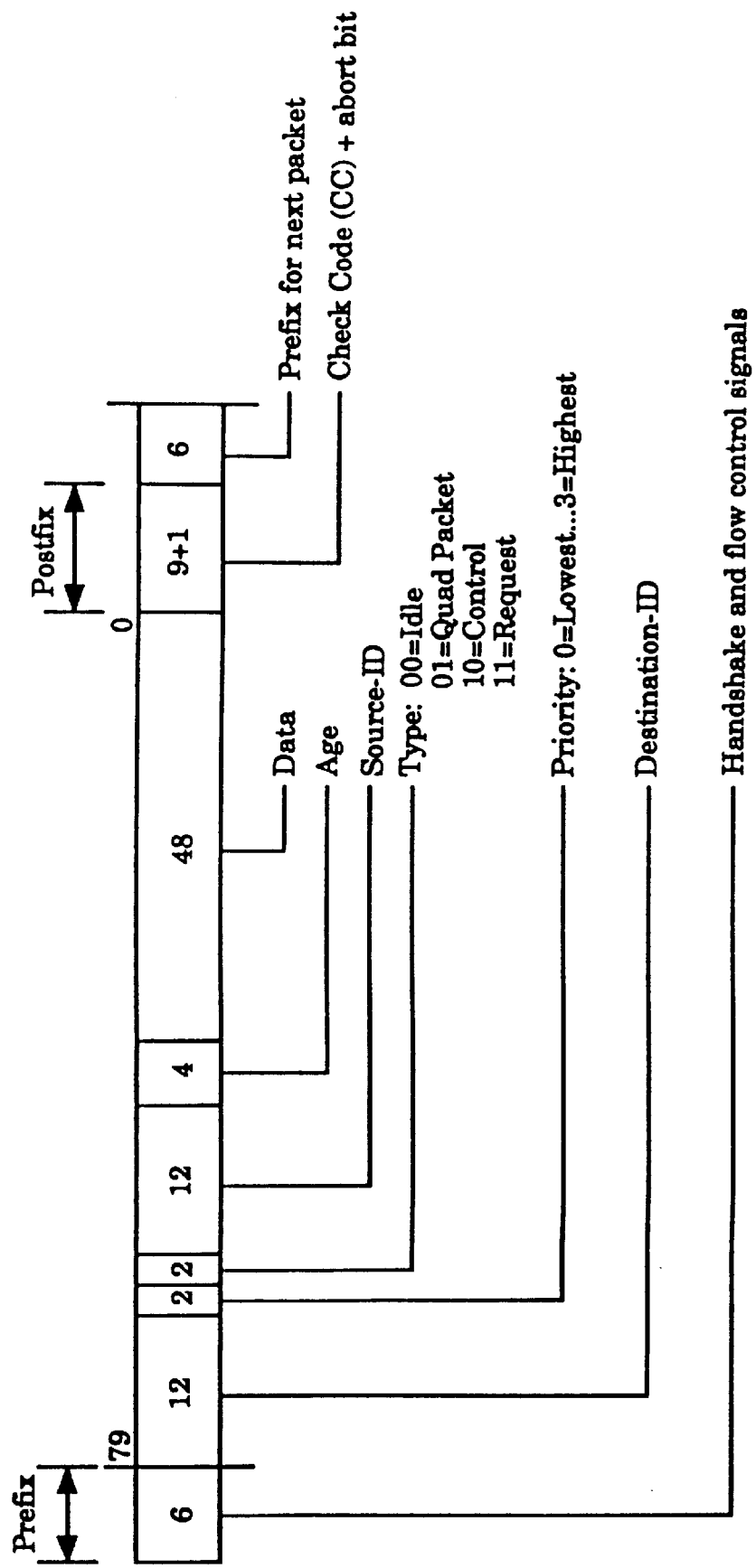
FIG. 6 illustrates graphically the layout for a given communications packet identifying the various fields of bits.

Referring now to FIG. 6, the bit assignment for a data packet is illustrated. The use of the data packet by the interconnect controller will be described by simultaneous reference to elements shown in the block diagram of FIG. 5. The data to be transmitted from a node may either have originated with the node's local host or have been received from another node en route to its ultimate destination. In any event the interconnect controller has buffered the data to be transferred and conveys packets to the appropriate channel module 80 bits at a time. As shown in FIG. 6, the 80 bits comprise first a 12-bit destination address. During system initialization, each node is assigned a unique address and each routing table is supplied with each address identifying the next node in the route for packets toward each address. Following the destination field there is a 2-bit field defining the priority of the packet. In the preferred embodiment four levels of priority have been suitable for all transactions thus making two bits sufficient. Likewise, the 2-bit field following the packet priority provides for identifying four different types of packets that may be sent. Each of these will be described in more detail in subsequent paragraphs. The 12-bit field following the packet type field provides the address of the node which was the source of a given packet. This is followed by a 4-bit age field. The age field is incremented upon certain conditions, such as when a delivery fails. Finally, following the age field the remaining 48 bits of information may be used for data.

The interconnect controller of the present invention recognizes four levels of priority such that high priority traffic is not blocked by congestion at a lower priority level. At least two levels of priorities are required to ensure that a memory coherency mechanism is deadlock free when the system is being used for distributed shared memory systems purposes. The remaining priority levels may be used to support time critical communications such as video or audio data traffic.

The appropriate channel module receives the 80 bits of the packet data and appends a 10-bit postfix. The first 9 bits of this postfix code are an error check code to be used by the receiving channel module to verify the integrity of the data transfer. The remaining one bit of postfix data is an abort bit that can cause the entire packet to be discarded. Following the 10-bit postfix data there is a 6-bit field that is a prefix for the following packet. The prefix contains the virtual channel id, a piggy-back acknowledgment bit, a quad packet component id and a one bit sequence code. Thus, a packet in transit between two nodes comprises 96 bits of information. Upon receipt of the 96 bits, a receiving channel module strips off the 16 appended bits. If the check code indicates that the packet has suffered no errors and the flow control information allows, the remaining 80 bits are supplied to the interconnect controller of the receiving node either to be routed to the next node on the way to its destination or are supplied to the node's local host if the receiving node is the final destination for the packet.

As was described above, the preferred embodiment implementation of the point-to-point communications protocol to be implemented has as an object the transferring of data in 32-byte blocks (cache line size). Clearly an 80-bit packet cannot accommodate 32 bytes (288 bits) of information. Therefore the concept of a quad packet is introduced. When data is being transferred (as opposed to idle packets or control packets) four successive packets are used. Hence the term quad packet. Only the first packet, the header packet, of a quad includes the destination, priority, type, source-id and age fields. The following three packets comprise a full 80 bits of data. When quad packets are sent, the prefix bits are used to identify that a following packet is part of a quad body. Thus the receiving channel module knows that no destination address will be included and that the quad body packets follow the quad header. Quad body packets are also provided with the 16-bits of appended information including the check code and flow control information. If any one of the quad packets has an error an error bit is indicated and the entire quad packet will need to be resent.

When a packet is transmitted from one node to another between coupled channel modules, it is necessary for the receiving node to acknowledge receipt to the transmitting node. There are many reasons for this, particularly, to indicate when retransmission is necessary due to errors. Another reason is because the sending node has only a finite amount of storage for holding pending packet transactions which should be flushed from its buffers upon completed transmission. Point-to-point packet propagation time is typically several times the length of packet transmission time. Therefore, there will be multiple packets in transit concurrently, each of which will be treated independently. Channels do not preserve transmission order, so the retransmission of a packet has no bearing on the state of the preceding or following packets.

In the preferred embodiment, each link consists of two physical connections that carry independent traffic in opposite directions. Since transmission is slotted into equally spaced packets in both directions, and because transmission rates are equal, the return traffic carries the replies of the forward traffic (piggy-back acknowledgments). The round-trip delay for a packet that is returned immediately by the remote node determines the number of slots in a channel. This measured delay is a critical constant for each channel, because it is used to avoid multi-bit sequence numbering or other means to match replies with outbound traffic. For a given channel delay of <n>, the reply is expected in the <n>th received packet. This mechanism for each channel is a ring of <n> independent slots. The same handshake logic is applied to each slot without taking the state of adjacent slots into account, which greatly simplifies the protocol processing. The maximum number of slots is dictated by the amount of independent storage for each slot's state which is a limitation on the maximum channel distance. Longer distances are possible, if channel bandwidth is reduced. In a such a case, idle packets are inserted into all slots for which no state storage is available.

When a packet is sent from node A to node B, node B upon receiving the packet sends its acknowledgment to node A. The acknowledgment is conducted by setting a bit in the postfix portion of the returning packet being sent from point B to point A at the time the message from point A to point B is received (the packet occupying the same slot). The two messages need not have anything in common other than the fact that the message from node B to node A occupies the same slot on the packet "conveyor belt" between the two nodes.

The value of the bit to be set in the piggy-back acknowledgment is a function of a value sent in the transmitted message from node A to node B. In the postfix control data bits, there is a bit called the msgSeqNo. Node A, when sending packets to node B alternates the value of this message between 0 and 1 for each successive transmission. Node B, in acknowledging the accurate receipt of a packet from node A sets a bit called rspSeqNo in the return packet being sent to node A equal to the opposite value from the msgSeqNo value of the received packet. Node A, upon receiving a packet in the appropriate slot will compare the rspSeqNo of the received packet to the msgSeqNo of the previously sent packet. If the values are toggled, then the channel module at node A need no longer store the original packet which was sent from node A to node B because it has been conveyed with no errors. Thus, piggy-back acknowledgments are used without requiring independent acknowledgment messages being routed between nodes.

Figure 7:
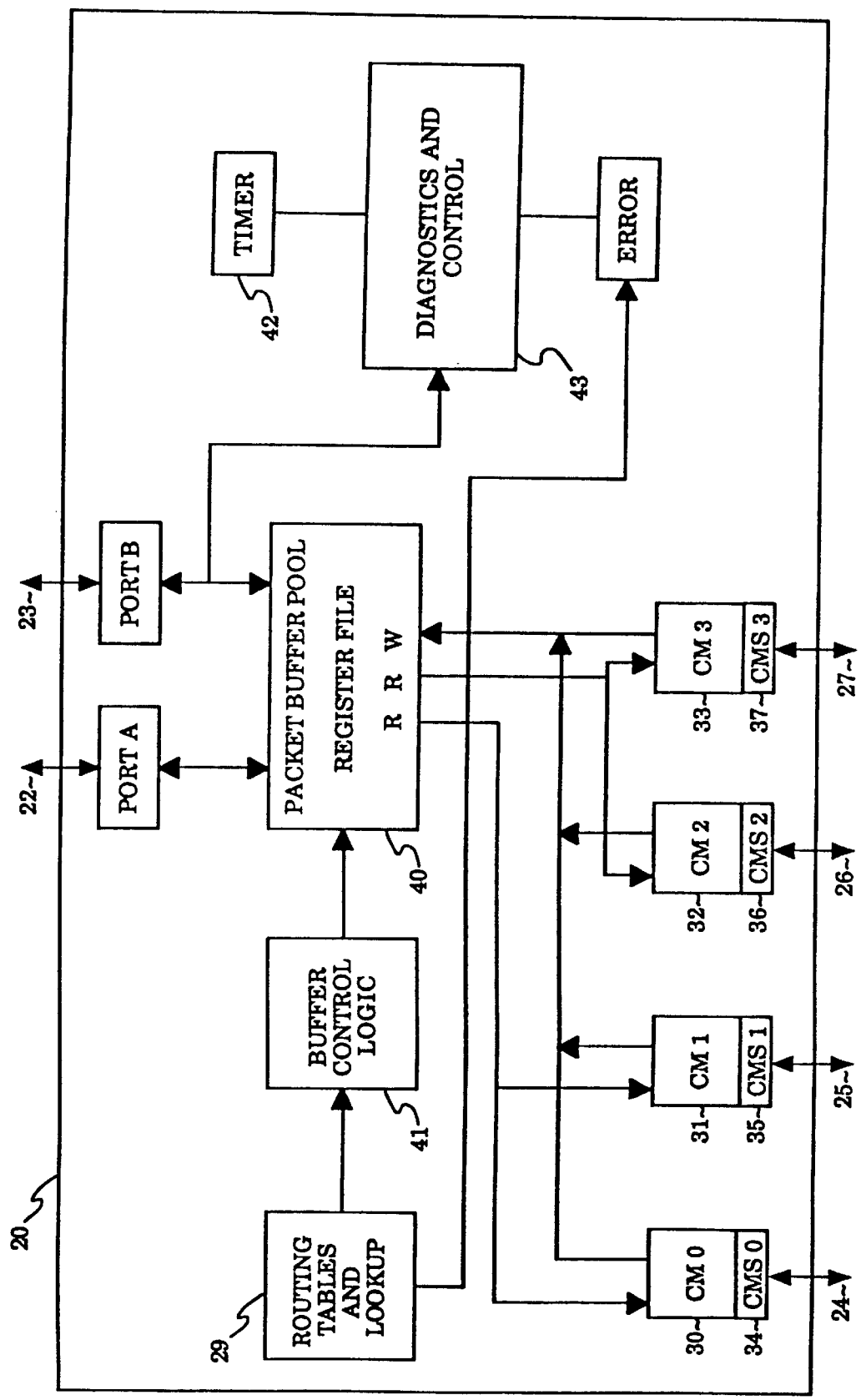
FIG. 7 illustrates a more detailed block diagram of the interconnect controller of the present invention.

FIG. 7 illustrates the interconnect controller of the present invention with the interconnect logic shown in more detail. Each interconnect controller is synchronized via an internal timing circuit 42. The details of an interconnect controller's timing logic are described further herein with respect to FIG. 14. The interconnect controller utilizes a common buffer pool for all communications channels. The common buffer pool comprises the packet buffer pool register file 40 and the packet buffer control logic 41. Each of the channel modules is coupled for reading and writing to the common buffer pool. In the preferred embodiment of the present invention, the packet buffer pool is multi-ported with channel modules 30 and 31 being coupled to one read port and channel modules 32 and 33 being coupled to a second read port. This facilitates the transmission of data from two channels of the node simultaneously. There is only a single write port to the packet buffer pool which is coupled to the 4-channel modules. Channel modules can all receive data at the same time but each are equipped with buffers for receiving packets and holding them until the write port on the buffer pool is available. Additional read and write ports are provided for conveying parallel data to a local host 21 over parallel transmission lines 22 and 23.

In the block diagram illustrated in FIG. 7, each channel module is shown with an associated channel maintenance subsystem. Channel maintenance subsystem 34 is associated with channel module 30, channel maintenance subsystem 35 is associated with channel module 31, channel maintenance subsystem 36 is associated with channel module 32, and channel maintenance subsystem 37 is associated with channel module 33. The channel maintenance subsystems include the low level function associated with bit serial data transmission that will be described further herein with respect to FIG. 11.

When a channel module attempts to write received data into the packet buffer pool, the 12-bit address is simultaneously supplied to the routing table circuitry 29. The routing table circuitry outputs an 8-bit word that specifies which virtual channel may be used for the packet. This word is interpreted by the buffer control logic 41. The buffer control logic 41 maintains a linked list index to the registers of the packet buffer pool. Various registers may be free or occupied at different times irrespective of their actual location in the register file. The linked list index provides head-to-tail linked list pointers for all stored data packets and is used to index the packet buffer pool 40. By using the multi-ported register file that is accessible by all channels, each channel module may deposit received packets without requiring dedicated storage for each channel.

Figure 8A:
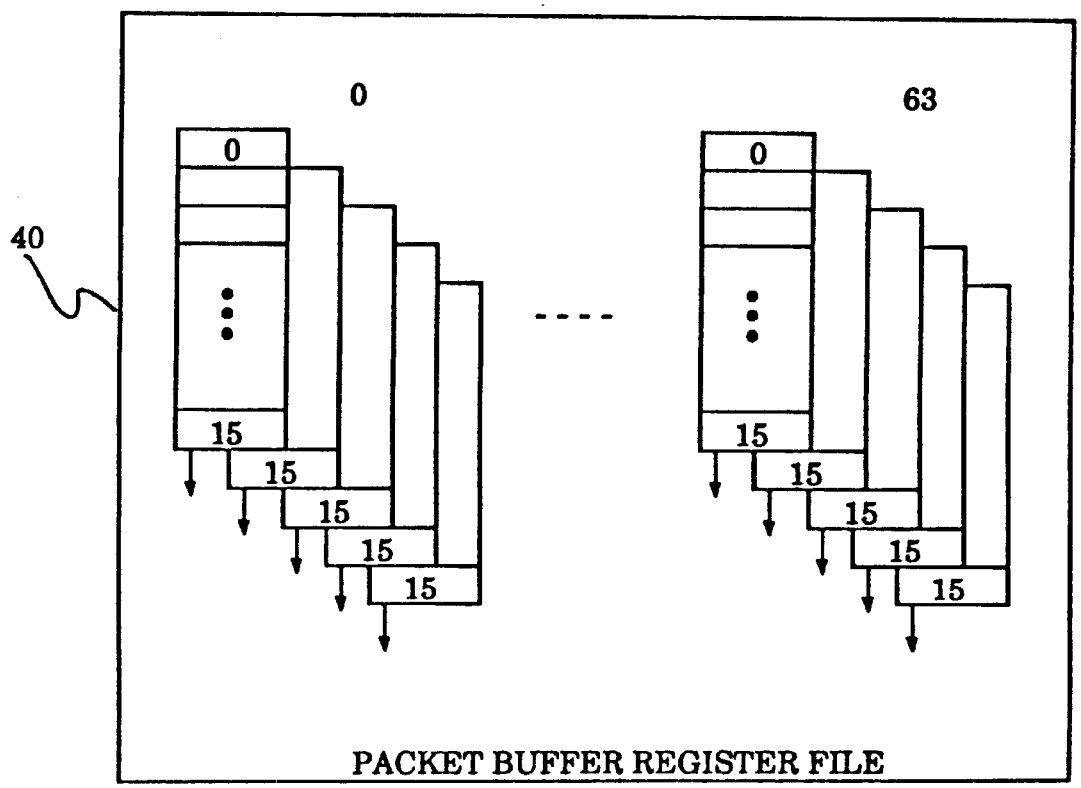
FIGS. 8(a) and 8(b) are a graphical representation of the common buffer pool utilized by the interconnect controller of the present invention.

As will be described, the channel modules each may include a serializer and deserializer for converting a 1-bit serial data stream into 16-bit packets and vice versa. The encoding method used (such as 8b/10b coding) must support three special code words, named C1, C2, C3, that cannot appear in the data stream. These out-of-bound code words are detected by the deserializer and are used to synchronize the channel maintenance subsystem during initialization. Three of these codes are used by the channel maintenance subsystem to establish the round-trip delay and proper packet synchronization to be described with respect to the initialization procedure flowchart of FIG. 16. Data will be exchanged between the common buffer pool and the channel modules 16 bits at a time. FIG. 8(a) is a more graphical illustration of the packet buffer register file arrangement. In the preferred embodiment, there is provision for 64 80-bit packets with each packet being stored in blocks of 16-bit double words. Thus, in some circumstances when one channel module receives a packet, the packet can be written from the receiving channel module to the buffer pool 16 bits at a time while it may begin being retransmitted through a second channel module on its way to the ultimate destination. Likewise, if the receiving node is the ultimate destination for the packet, the packet buffer logic may immediately convey the packet to the local host 16 bits at a time while the packet is still being received.

Figure 8B:
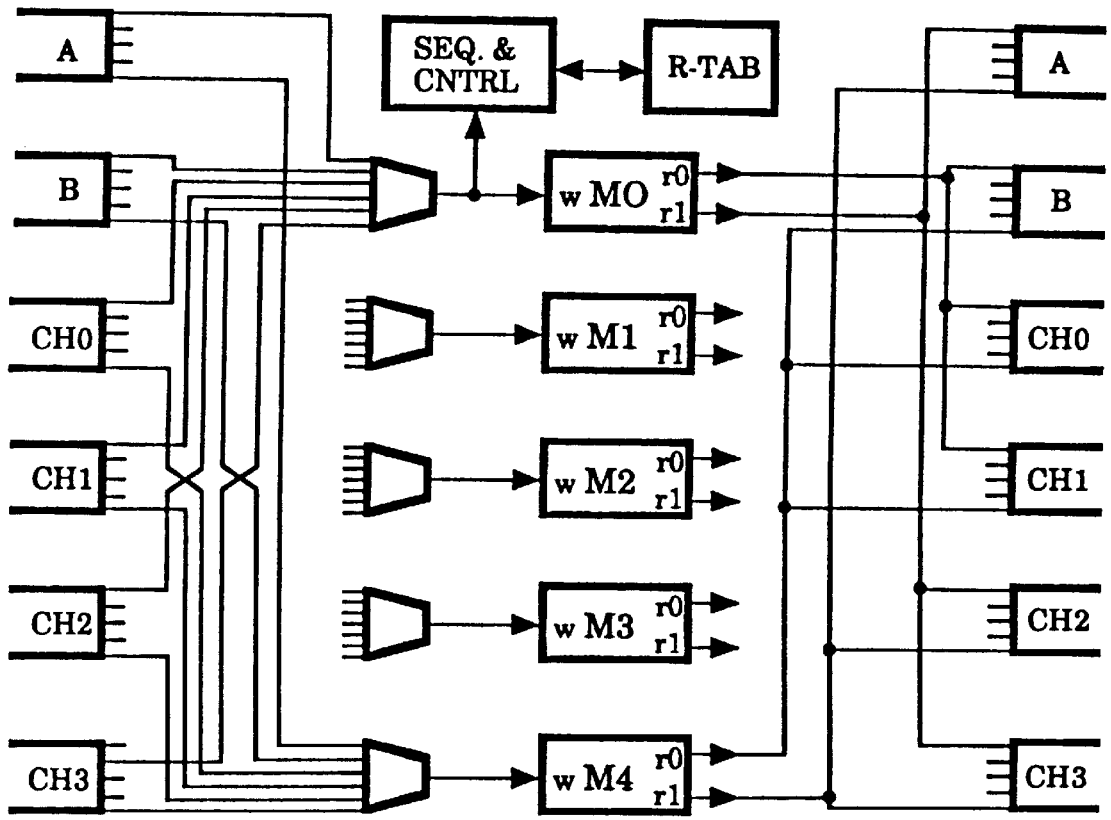

While the packet register buffer is a multi-port register file that can hold 64 packets of 80 bits each, logically it appears as a set of queues for each virtual channel and priority level. The file is, as described, physically subdivided into five banks so that packets can be inserted and removed in quantities of 16 bits. FIG. 8(b) illustrates the relationship of the five subdivided banks with each of the serial and parallel channels. The location in the register file to store the incoming packet is computed in advance given a bit vector representing the free buffers. Additional buffer reservation logic maintains separate buffer pools depending on the virtual channel and packet priority.

At the write port of the first memory bank, a newly-received packet is input to the router control logic. The first 16-bit piece of data contains the destination address, priority and type. Concurrently with the write operation, the destination address is used to perform a routing table lookup in routing table circuitry 29. As described, the routing table entry consists of an 8-bit virtual channel mask which accommodates all combinations of four channels with two virtual channels each. A set bit in the virtual channel mask designates the corresponding channel module as a path. The least significant 4 bits specify virtual channel 0 while the most significant 4 bits specify virtual channel 1 and all 0 entry designates parallel port A, while all 1's entry designates parallel port B. The virtual channel mask, priority and the virtual channel contained in the prefix are used to determine into which queue the packet will be appended. The queue structure uses the linked lists hardware described previously.

Enqueue and dequeue operations may overlap such that sending of a packet may commence before it has entirely been received. Because of this overlap, a check code error on an incoming packet causes an abort bit to be set in the corresponding outgoing packet so that the receiving logic of the final node is able to discard the packet when it all arrives at one place.

All the operations concerning receiving routing enqueuing/dequeuing take place concurrently at a rate that matches the total packet throughput rate. This performance can be achieved because all packets are of equal size and arrive at precisely scheduled time slots.

Figure 9:
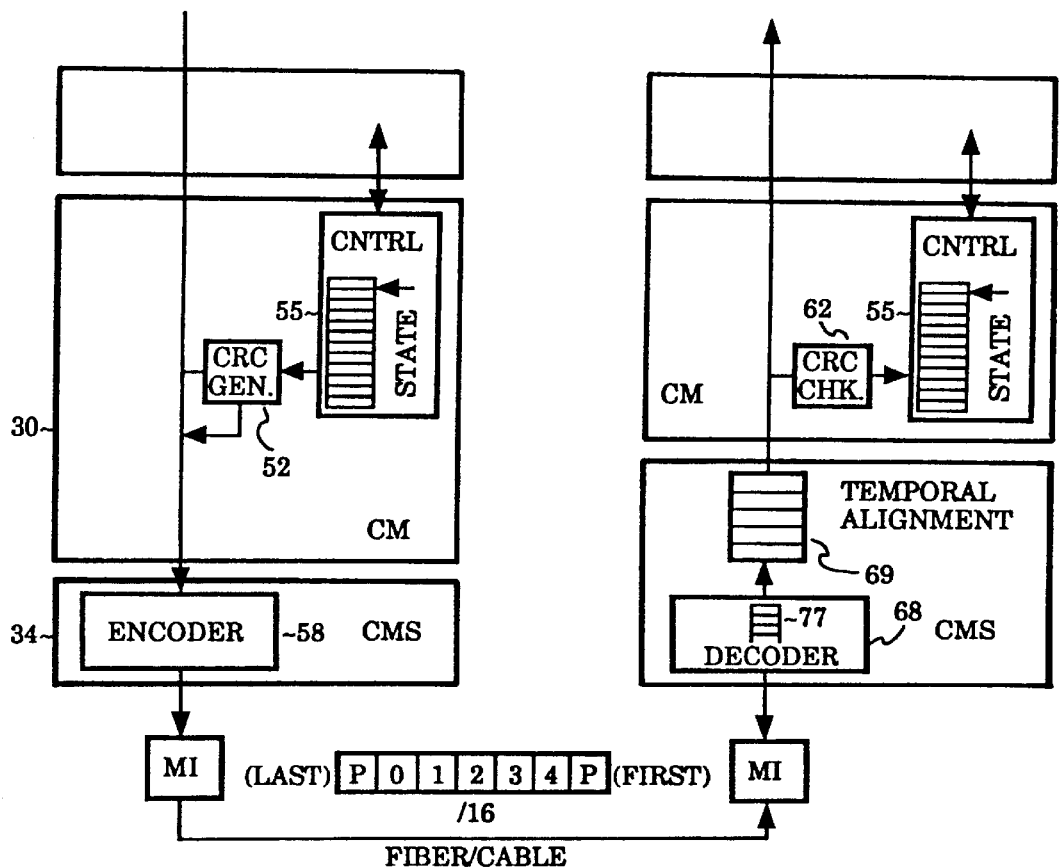
FIG. 9 illustrates two channel modules coupled for the purpose of illustrating a packet exchange from a sending channel module to a receiving channel module as carried out by the interconnect controller of the present invention.

FIG. 9 is provided to demonstrate the operation of a channel module and channel maintenance subsystem from both the transmitting end and receiving end of a packet transfer transaction. From the transmitting channel module, a data packet is received in 16-bit increments from the packet buffer pool. To each data packet the check code is calculated and appended by the CRC generator 52. The multiplexing logic and check code generation circuit are driven by the channel modules control logic 55 which also communicates with the packet buffer register file and its associated logic. Within the control logic for each channel module there exists a collection of data registers or buffers with information about each slot in the packet "conveyor belt" which circulates between connected channel modules. From the channel module, the data packet proceeds to the channel maintenance subsystem which by means of encoding logic 58 serializes the data for transmission as a serial bit stream across the chosen communications media such as fiber optic cable or twisted pair cable.

A channel module on the receiving end of a packet transmission receives the 96 bits of the packet data with appended postfix data as a serial bit stream. The channel maintenance subsystem at decoding logic 68 of the receiving channel modules decodes the incoming packet. The encoding logic 58 is implemented at design time to follow a predetermined encoding algorithm. The decoding logic of the receiving channel module must be selected for decoding the chosen encoding scheme. The packet is then aligned to 16-bit double words at packet alignment circuit 69. The packet alignment circuit 69 includes a queue to absorb clock jitters and the variable delay element, the temporal alignment buffer 69, that is used to adjust the round-trip delay to an integral multiple of the routing cycle. The temporal alignment buffer 69 is used to adjust the signal transit time to be in integral multiple of the packet transmission time. This is achieved by adding the delay element in the receive data path, which is essentially a 16-bit wide shift register of depth 0–5. The depth is set during the initialization procedure when the round-trip delay is calculated and the packet transmission time is known. A depth of 0–5 is sufficient because a six clock cycle pipeline is utilized by the preferred embodiment interconnect controller. At the receiving channel module the 16-bit postfix is stripped off with the check code being confirmed at the CRC check code circuit 62. The six control bits are then processed by the control logic 55. The 80 bits comprising the data packet are then processed for storage in the common buffer pool of the interconnect controller.

One of the bits in the 6-bit control portion of the prefix is a piggy-back acknowledgment of a previously sent packet in the same slot by the receiving channel module. If the acknowledgment bit checks out properly such that the rspSeqNo is the inverse of the msgSeqNo then the packet state register buffer for that packet is cleared and a control signal is sent to the common packet buffer pool thus freeing space in the buffer pool once a packet has been successfully conveyed from a given interconnect controller.

Figure 10:
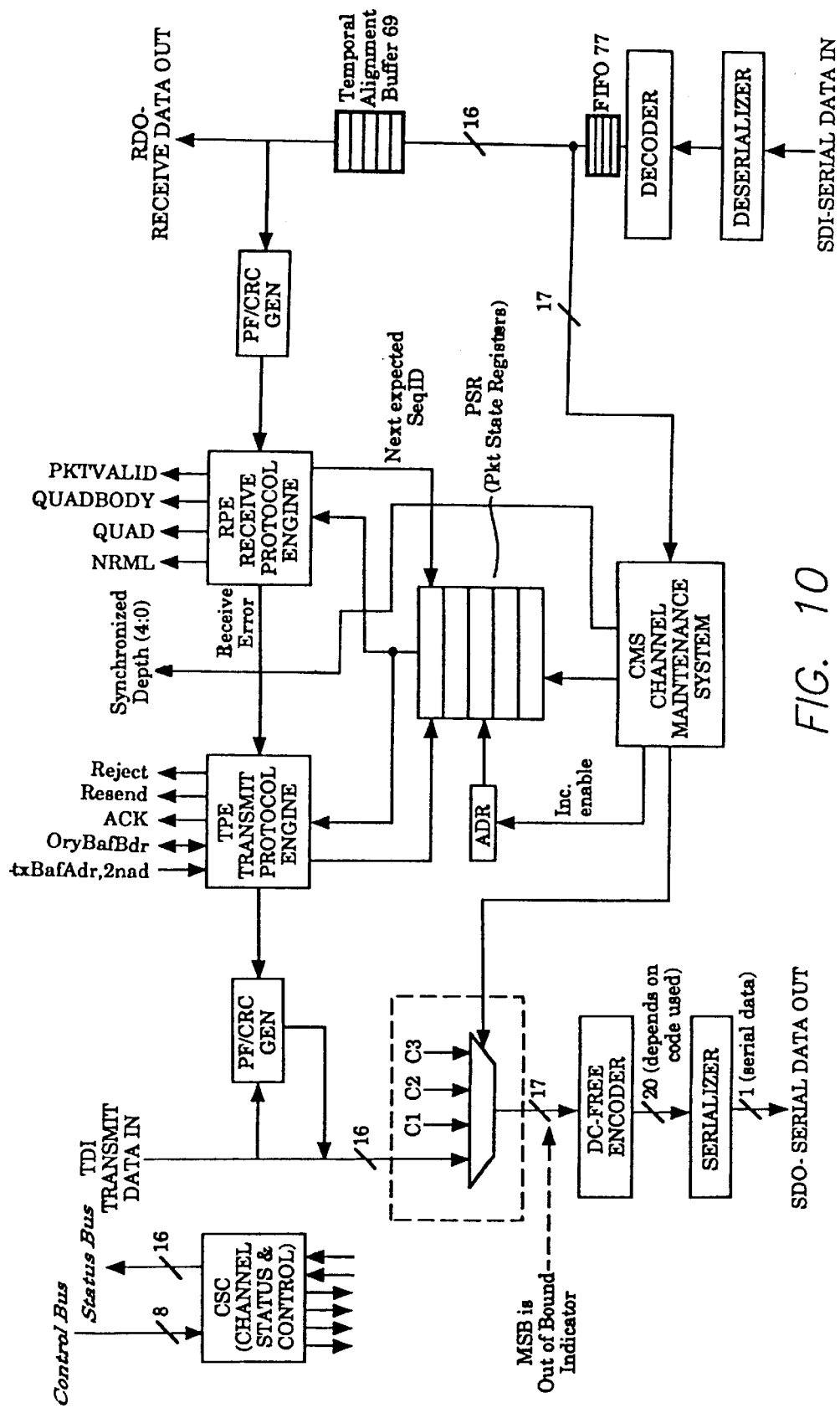
FIG. 10 is a more detailed illustration of the channel module portion of the interconnect controller in accordance with a preferred embodiment of the present invention.

FIG. 10 is provided to illustrate in more detail the channel module logic of the present invention. The illustration of FIG. 10 incorporates both the transmission and receiving portions of the channel module as well as the control logic and packet state register file. The control portion of the channel maintenance subsystem is illustrated separate from the decoding and the encoding circuitry but provides the controls for processing of signals as describe above. Also illustrated in FIG. 10 are the FIFO buffer and temporal alignment buffer 69 which are used for synchronizing signals to be an integral multiple of packet transmission times. FIG. 10 illustrates that in the preferred embodiment these elements are incorporated on the packet receiving side of the mechanism.

Figure 11:
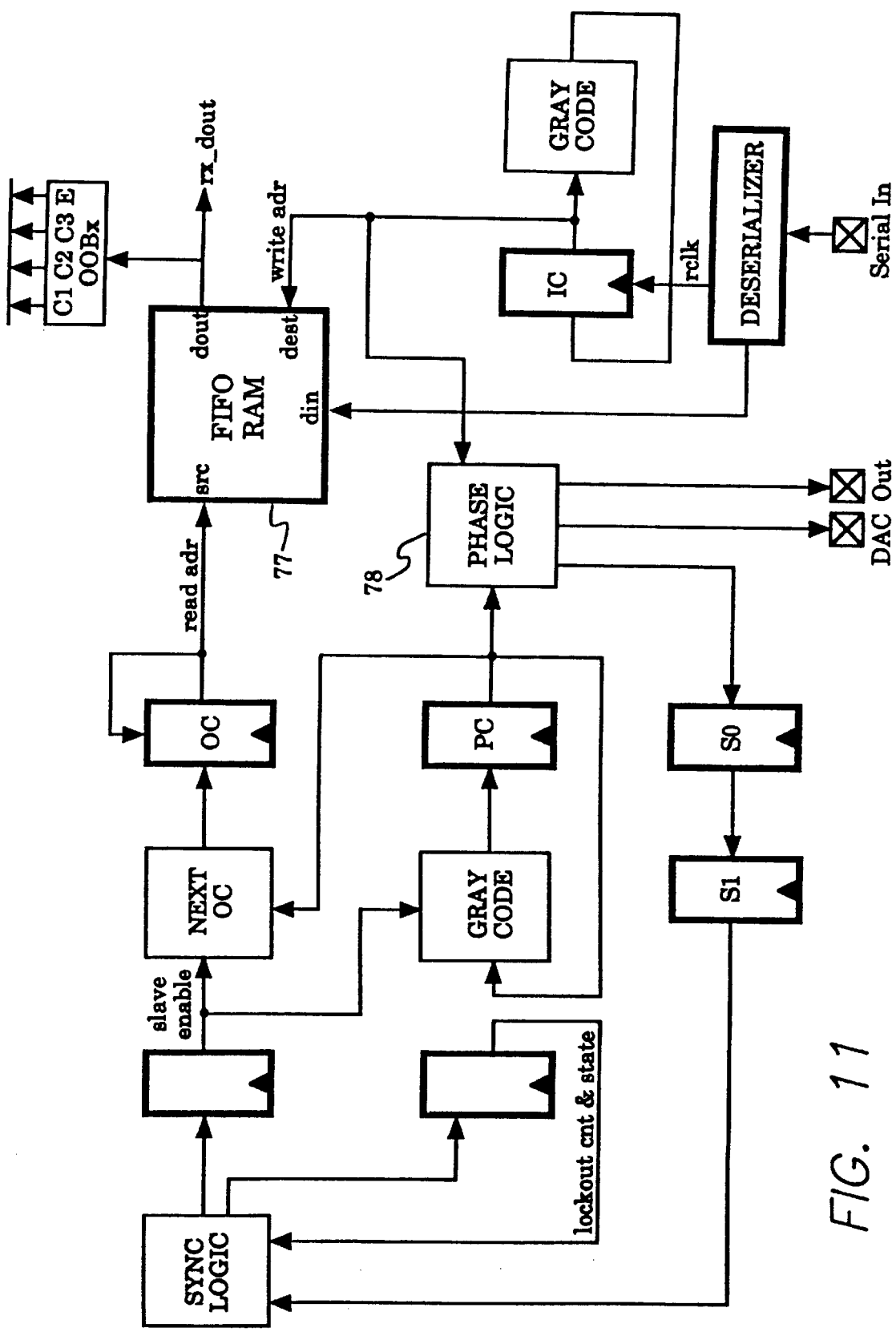
FIG. 11 is a more detailed illustration of the channel maintenance subsystem portion of the interconnect controller of the present invention.

FIG. 11 shows in more detail a portion of a channel maintenance subsystem. Of particular interest here is the FIFO RAM 77 which is a buffer for receiving packet signals. One function of FIFO RAM 77 will be discussed further herein is its use for synchronizing clocks between linked channel modules by monitoring the depth of the data stored in the FIFO buffer.

Figure 12:
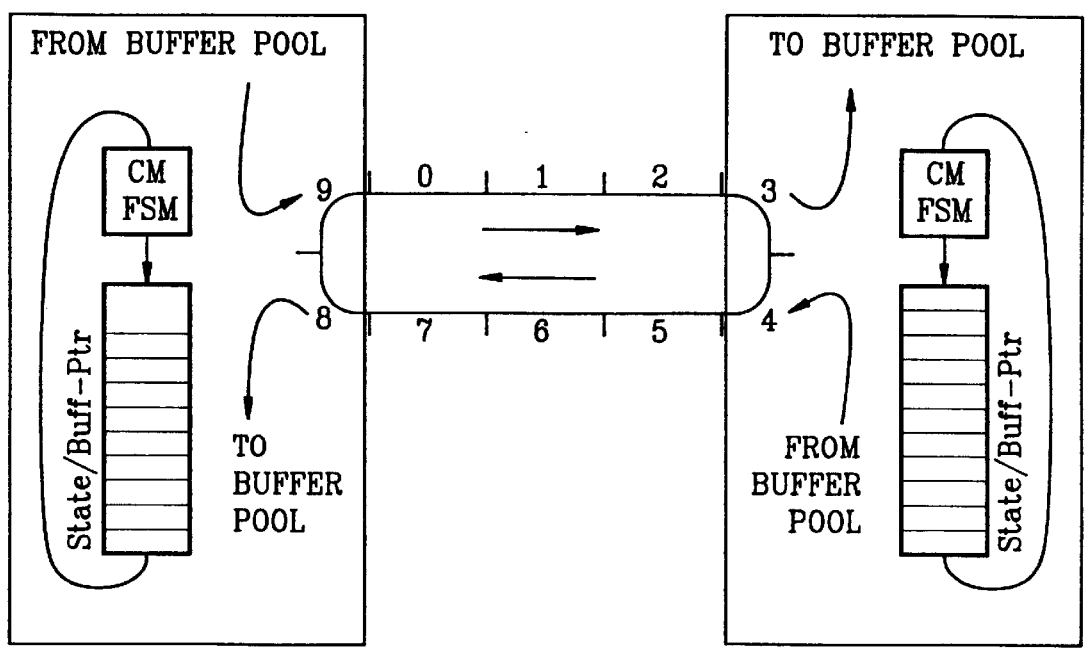
FIG. 12 demonstrates graphically the conveyor belt nature of packet slots between two coupled channel modules in accordance with the communications protocol of the present invention.

FIG. 12 is provided to illustrate a graphical demonstration of the conveyor belt nature of the slotted packet exchange between linked channel modules. As was described, the transmission time between adjacent channel modules is adjusted by means of the temporal alignment buffer to provide exactly an integral number of packet transmission times for the total round-trip delay. In the illustration of FIG. 12, a ten slot communication link is illustrated. There is provided at both channel modules a packet state buffer register file which provides for 10 different entries in the case of FIG. 12, each corresponding to one slot in the link. If a link is of a length such that there are more slots than available storage space in the state buffer register file, idle packets are inserted to insure that a state buffer is available for each useful slot.

Logically, the interconnect controller has six packet sources and six packet drains that are connected through a set of 40 queues. For each outbound channel, there is one queue for each combination of four priority levels and two virtual channels. The transmitters serve their queues in strict priority order: as long as there is pending traffic in a high priority queue, no lower priority queue will be served. The four serial channels have actually two sets of independent queues, one for each of two virtual channels that do not interfere with each other. Channels alternately serve their virtual channels fairly. However, if a virtual channel has no pending traffic, the entire channel capacity is available to the other virtual channel. Virtual channels are used to avoid deadlocks and are identified when the routing tables are filled.

A packet transmission is not assumed to be error free, rather the channel module has to verify packet integrity based on the check codes appended in the postfix. Packets which are rejected by a channel module due to lack of buffers or a corrupted packet are placed in a reject queue by the sender. Rejected packets go through a routing cycle to determine a new transmit channel and are then inserted at the head of the corresponding outbound queue. Higher priority is given to rejected packets in order to reduce the average latency variation. Receive errors also corrupt the piggy-back acknowledgment which causes the original packet sent in a corresponding time slot to be retransmitted. In the event of a duplicate transmission, the receiver will discard the packet since the sequence ID bit of the incoming packet will not match the expected sequence ID bit.

The channel module protocol has the property that it neither drops or duplicates packets. In the presence of transmission errors, the determination that a transfer is completed depends on a number of errors that occur. Once it is sent, a packet and its associated buffer are locked by the channel module until it can be determined that the transfer succeeded or failed. If a packet transmission has failed, the packet is returned to the router and a new routing decision is made. Each of these failures causes the age field of the packet to be incremented, so that packets cannot indefinitely retry. When the age field has been saturated, a packet is returned to the sending node which attempts again to route the traffic. If the age field is twice saturated, the local host of the final saturating node is notified for error processing or a user is alerted.

Because the communications protocol of the present invention requires each channel module to know exactly when packets are going to be received, it is necessary that all the interconnect controllers share a global clock so that all their channel modules are synchronized with respect to the timing of packet exchanges. A single clock source eliminates the need for synchronizers in many places, most notably in the communication channels. This avoids delays and reduces the potential for intermittent failures.

For the reasons discussed above, the clocks of all interconnect controllers need to be synchronized. However, no tight bounds on the clock skew will be required, so that the clocks of two different clusters may vary their phase as long as their average phase relation is constant and transient phase differences do not exceed ±¼ of the packet transmission time.

There are no clock wires connecting interconnect controllers, instead clocks are recovered from the data transmissions. These transmissions are synchronous and continuous so that a reconstructed clock is always available. Periods with no data to be transmitted are filled with idle packets that exchange low priority status information. At each interconnect controller, the recovered clocks of the incoming channels are compared to the local clock as illustrated by FIG. 13.

Each recovered clock (IN-0 . . . , IN-n) is fed into frequency/phase comparator. Frequency/phase comparators differ from plain phase comparators in their ability to compare the frequency of uncorrelated signals. Plain phase comparators, are simpler and more precise in the locked state. However, they produce random output signals if the input signals are uncorrelated. A normal PLL circuit will eventually acquire lock. The "PLL" circuit in FIG. 13 tries to achieve phase lock among a distributed set of oscillators and probably would not work with plain phase detectors.

Figure 13:
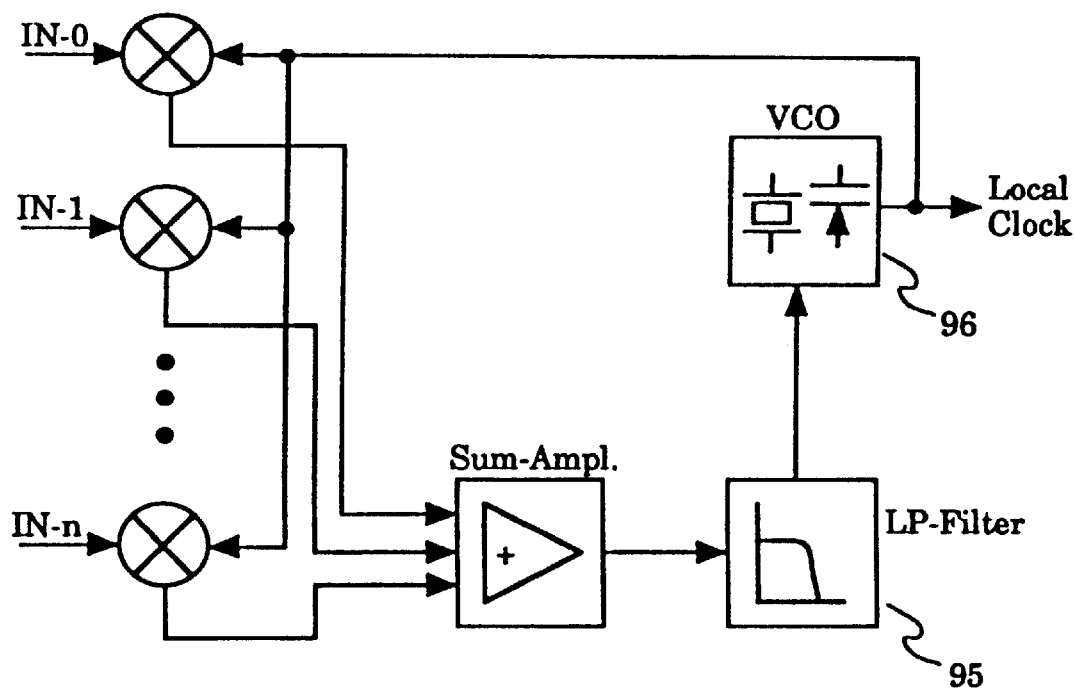
FIG. 13 illustrates a portion of the timing circuitry to be utilized by the interconnect controller of the present invention.
Figure 14:
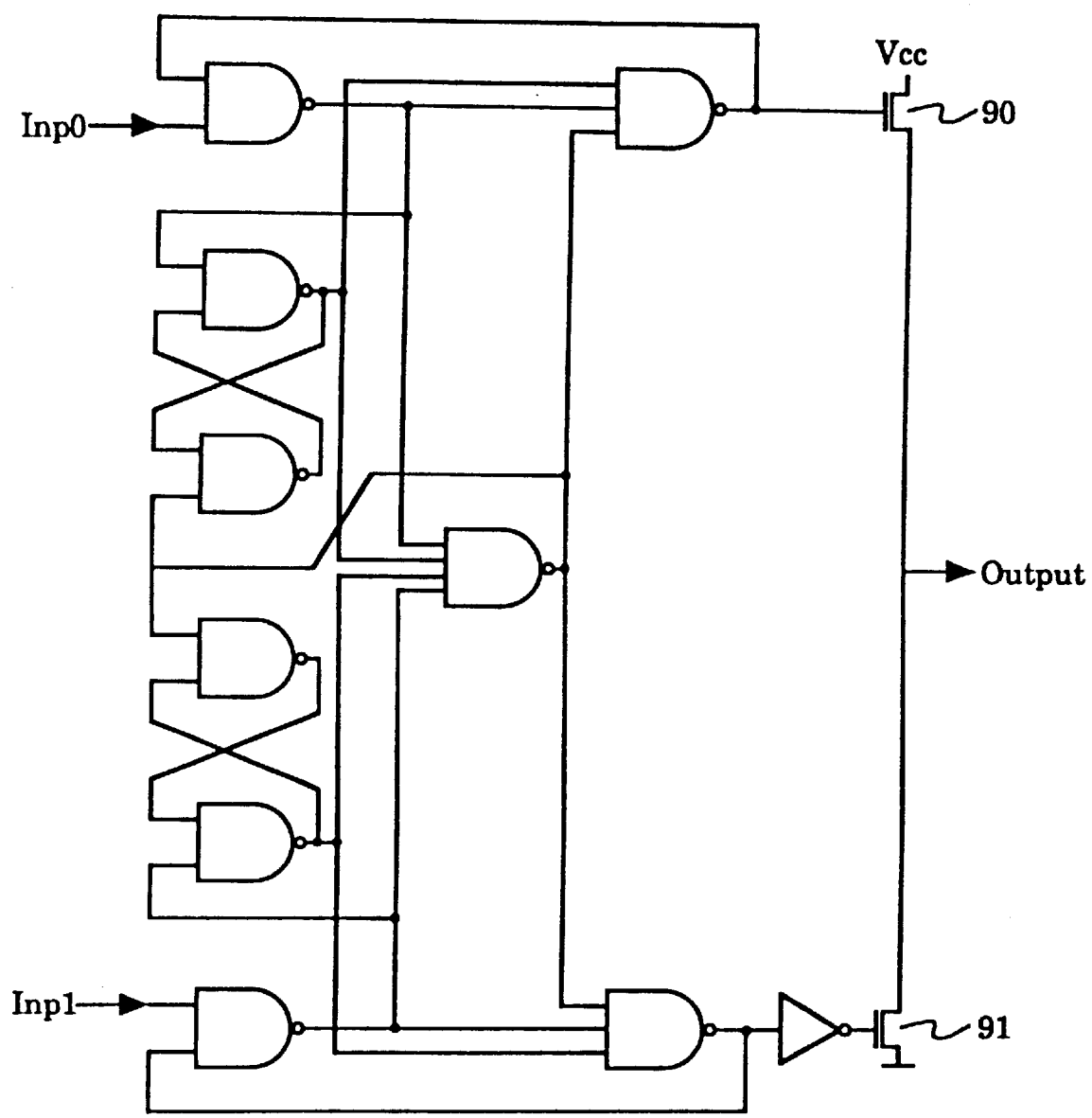
FIG. 14 illustrates a typical frequency/phase comparator that may be used with the present invention.

A typical frequency/phase comparator is outlined in FIG. 14. This circuit is easily integrated with current CMOS technology. The output acts as a charge pump and is meant to be connected to a high capacitance node. The two output transistors 90 and 91 are very small and act as current sources that are briefly turned on to add or remove charge from the output node, which becomes part of the subsequent low pass filter 95 (FIG. 13). This has the advantage that the outputs of several comparators can be tied together to form a cumulative integrator. In the locked state, the net output current becomes 0. Multiple units can be integrated on one chip such that both output transistors are disabled if the corresponding channel is unused or loses synchronization.

It is important to note that the VCO 96 of FIG. 13 is crystal based. The operating frequency of a crystal oscillator is very well defined. Tolerances of $10^{-6}$ are not uncommon. The assumption that the open loop center frequencies over the operating temperature range of all interconnect controllers are within $\pm 10^{-4}$ of the design specification is quite conservative. Crystal oscillators can be electrically tuned within a narrow range of about $\pm 10^{-3} \cdot f_0$. Such a voltage controlled (crystal–) oscillator is a good local clock source even if the control loop is disabled or in an arbitrary state.

The above discussion with respect to the distribution of clock signals can be found in Nowatzyk, A., Communications Architecture for Multi-Processor Networks, Ph.D. Dissertation, Carnegie Mellon University, December 1989, which is incorporated herein by reference. In summary, an interconnect controller recovers all clocks received from channel modules to which it is connected and compares them to its own clock, averages over the comparison and then uses the average to adjust its own clock. With all interconnect controllers doing this, after a brief transient start-up time, the overall network will operate on a single distributed global clock.

One refinement incorporated in the present invention is to use the FIFO buffer 77 and phase logic 78 of the channel maintenance subsystem of FIG. 11 as the phase/frequency comparator. The FIFO depth will change with respect to the synchronization with the clock of a connected channel module. That is, the FIFO buffer 77 of a given channel module will begin to fill up if that channel module is running slower than the channel module from which it is receiving data. Likewise, the FIFO buffer will begin to empty for a channel module that is running faster than the channel module it is coupled to. The deviation from the ½ full state of the FIFO is proportional to the phase difference of the clocks of the sending and receiving nodes. If there exists a difference in frequency between these nodes, the rate of FIFO overflows/underflows is proportional to the frequency difference. Provided that the FIFO controller does not wrap around (an overflow cannot result into the empty FIFO state), the FIFO depth is a measure of both phase and frequency differences.

Figure 15:
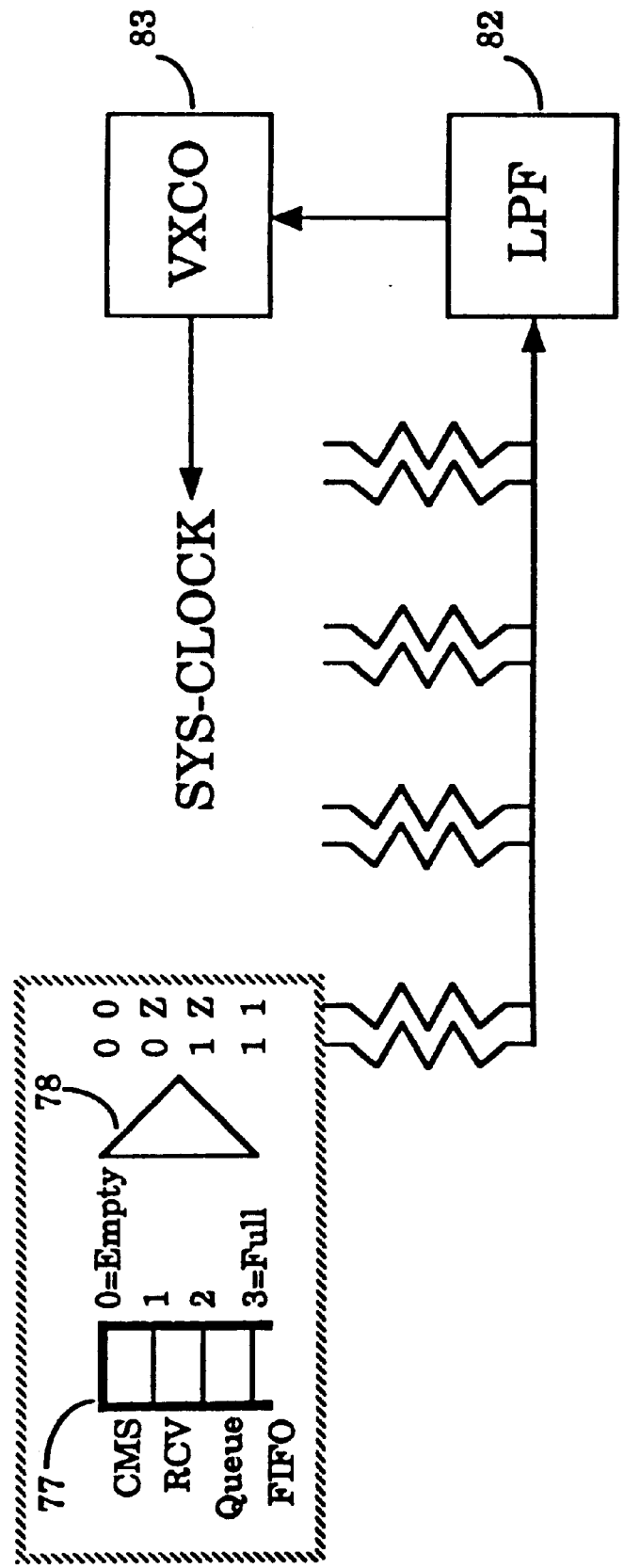
FIG. 15 demonstrates using the FIFO buffer of the present invention as a phase/frequency comparator for use in clock synchronizing.

FIG. 15 illustrates graphically by means of a truth table how the FIFO buffer depth is translated into an analog signal that reflects the phase/frequency difference. This signal is externally low-pass filtered by LPF 82 and used to control the voltage controlled oscillator 83 that supplies the clock for the system. By adjusting the values of the resistors, a piece-wise approximation of a cubic transfer function is realized which causes faster convergence to a common operating frequency which is biased toward the average of the free running center frequencies of all nodes. Ideally, the FIFO buffer should remain half-full in synchronized operation. The monitoring of the FIFO buffer depth is carried out by the phase logic 78 coupled to the FIFO 77 (FIG. 11). The phase logic drives the FIFO depth result to a digital-to-analog converter (not shown) which supplies the input to LPF 82.

In the preferred embodiment, the FIFO buffer 77 and temporal alignment buffer 69 are implemented with a common memory with separate read and write ports.

The timing circuit 42 for an interconnect controller as illustrated in FIG. 7 includes a counter which maintains a current value corresponding to the real-time maintained by the interconnect controller. One aspect of the present invention is that diagnostic packets may be propagated between coupled channel modules with a header then indicates that they are such diagnostic packets. A time stamp may be included in such a packet which indicates the time at the transmitting interconnect controller when the packet is sent. Since the receiving packet knows the delay in time between transmission and receipt of exchanged packets, it is capable of determining in its logic what time the resident timer counter should have. This counter may be programmed by the interconnect controller logic and adjusted atomically such that all coupled interconnect controllers can establish a consistent time.

Another aspect of programmable interconnect controllers is that they may be operated remotely by transmitted control signals. The control logic includes locks which are intended to be used in distributed topology exploration algorithms. In this case, multiple nodes may start independently to map the interconnect system by incrementally adding nodes to the explored domain. The locks in each node prevent a node to be mapped by two different mapping agents. Instead, they will notice that more than one mapping agent is active and an arbitration process will be used to merge the two domains with only one mapping agent continuing the process. Additionally, the interconnect controller logic should be equipped with a watchdog timer such that a node, if put into a lock state, will emerge and wait in an accessible state for commands after some predetermined amount of time. Thus, where a node having an interconnect controller is in an unreachable location, it cannot be permanently disconnected from the network with no hope of recovering access to it. This watchdog timer will activate whenever the node is in some sort of critical state and will wake it up to an accessible state after a predetermined amount of time. This facility also provides for remote configuration of interconnect controllers.

Figure 16:
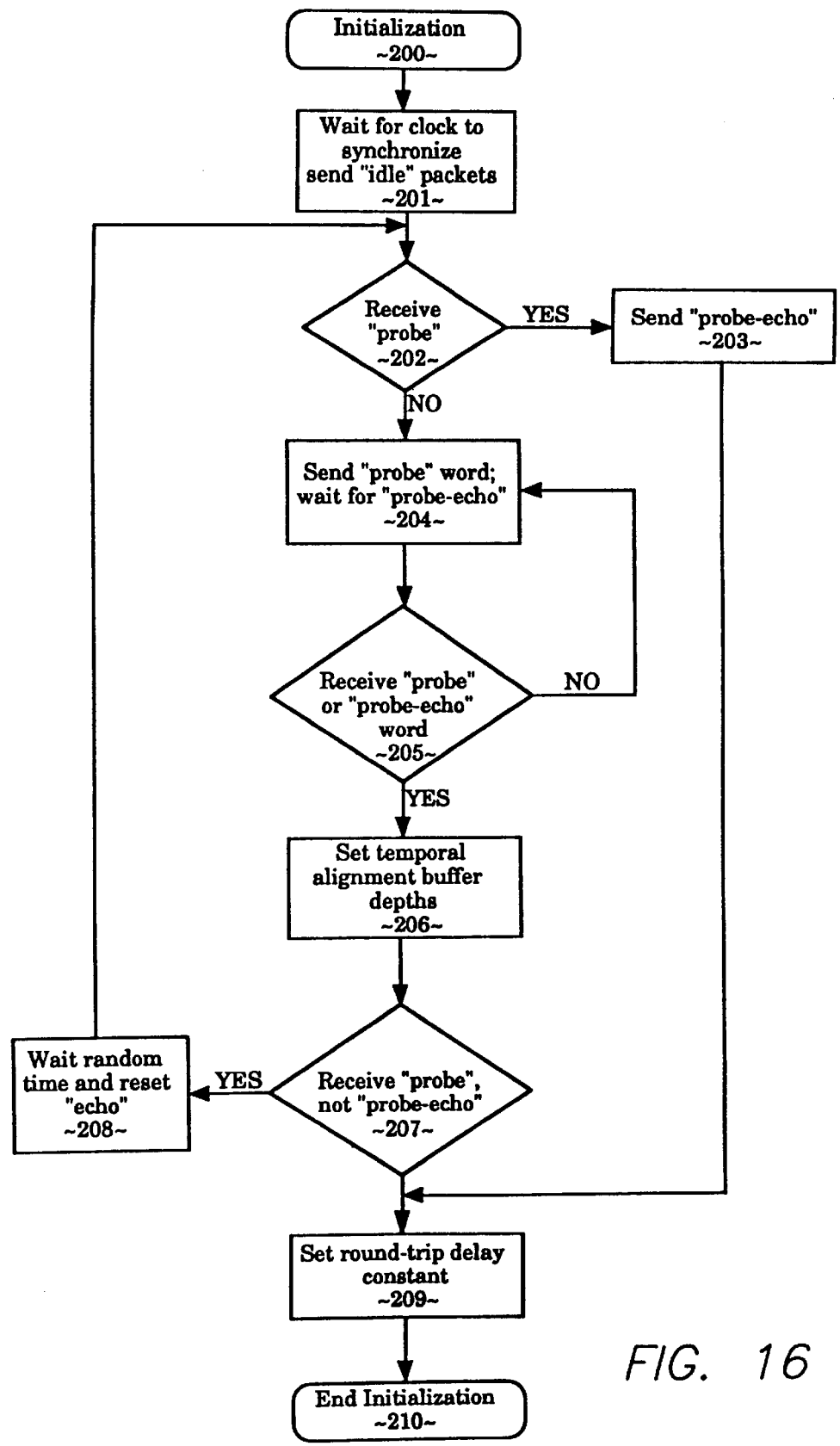
FIG. 16 is a flowchart of the initialization procedure used by the channel modules of the interconnect controller of the present invention.

Finally, it is instructive to discuss how upon initialization each interconnect controller determines such things as the round-trip delay between coupled channel modules. FIG. 16 is a flowchart illustrating the initialization procedure that is carried out by the logic of the interconnect controller of the present invention. Appendix A illustrates a verilog program listing which can be used to generate the logic of the present invention.

FIG. 16 illustrates the initialization procedure 200. Initially upon power-up reset, at step 201 each channel module sends a constant "idle" bit pattern which is an out of band signal (C1). Channel modules that receive this pattern assert a signal detect bit which indicates that the channel module is coupled to another channel module and is not a non-connected port. The initialization procedure waits a programmable delay to allow stabilization of the distributed phase lock loop and clock distribution. If after synchronization at decision box 202 a channel module receives a "probe" word (C2) from a channel module to which it is coupled then at step 203 the channel module receiving the "probe" word sends a "probe-echo" (C3) word back to the probing channel module.

Once the system has stabilized and if no probe word has been received by the channel module then at step 204, the channel module will initiate the sending of a "probe" (C2) word to the channel module to which it is coupled. The "probe" (C2) word is an out of band signal which causes the remote channel module to send a "probe-echo" (C3) word in response. Sending of both the "probe" and "probe-echo" words are synchronized to the routing cycle of the sending channel modules. At step 205, if no signal is received from the remote channel module then the routine loops until either the receipt of the "probe-echo" word or until the receipt of a "probe" word from a remote channel module that may have sent its "probe" word at the same time. At step 206, the receiving of either signal, "probe" or "probe-echo", provides the ability to set the temporal alignment delay so that the probe words arrive synchronized to the respective routing cycles. If at step 207 it turns out that a channel module which sent the "probe" word receives back a "probe" word and not the "probe-echo" word, a form of deadlock in determining which of the two modules is the master for initialization purposes occurs. This case is resolved with a probabilistic protocol at step 208 where each side randomly decide whether or not to echo the C2 probe words. Once an asymmetric decision is made (via "electronically flipping a coin"), the initialization completes at step 209. The outcome of the decision is recorded in the Master/Slave bits described previously.

The same procedure described above may be used for resynchronization after a transient synchronization loss. Either node may stop normal transmission and start sending the C1 signal.

Figure 17:
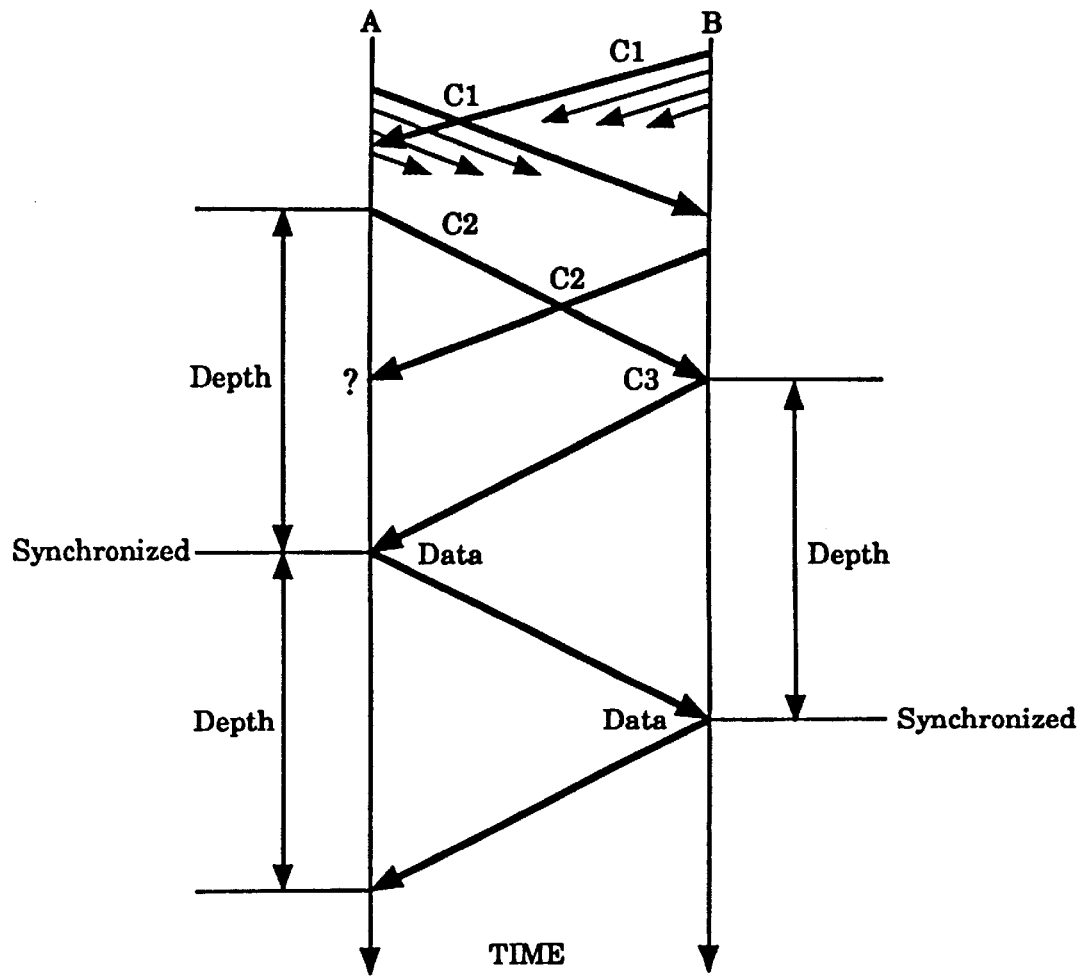
FIG. 17 illustrates graphically the intended flow of the initialization procedure as carried out by the software.

FIG. 17 illustrates graphically the signal exchanges as described by the Appendix A program listing for initialization. In this illustration, C1 represents the abort or initial synchronization pattern. C2 represents the "probe" word and C3 represents the "probe-echo" word as described with respect to the procedure of FIG. 16.

An interconnect controller and communications protocol have been described for use by a node in an arbitrary topology collection of nodes in a network suitable for use for both data sharing and distributed computing. Although the present invention has been described in terms of preferred embodiments, it will be appreciated that various modifications and alterations might be made by those skilled in the art without departing from the spirit and scope of the invention. The invention should, therefore, be measured in terms of the claims which follow.

We claim:

1. For use by nodes in an arbitrary topology collection of nodes wherein each node may have a plurality of communications channels and a plurality of adjacent nodes to each of which the node is coupled through a single communications channel, respectively, each of said nodes having an interconnect controller having means for controlling the exchange of data packets having a length of (W) bits over communications channel, wherein to transmit a packet having (W) bits plus (X) appended control bits requires a time (T), the method of exchanging data packets between adjacent nodes comprising the steps of:

adjusting the round trip delay ($D_{ij}$) for data packets transmitted between adjacent nodes i and j to equal an integral multiple of the packet transmission time (T) thus providing for $D_{ij}/T$ packet transmission slots between adjacent nodes i and j;

each node receiving data packets from all adjacent nodes through all coupled communications channels;

using a routing table to generate an index for said received data packets;

storing said data packets in a common buffer pool shared by a given node's communications channels;

queuing packets stored in said common buffer pool of a node for transmission to an adjacent node through an appropriate communications channel where said selection of said appropriate communications channel is made using said index;

continuously conveying data packets between adjacent nodes through isochronous coupled communications channels by conveying a data packet upon receiving a data packet.

2. The method of claim 1 wherein after said queuing step said method further comprises the steps of:

extracting a data packet from said common buffer pool for transmission through said selected communications channel;

determining check code bits for said data packet based on the content of said data packet; and appending said data packet with said check code bits.

3. The method of claim 2 wherein after said receiving step and before said storing step said method further comprises the steps of:

extracting said check code bits from a received data packet;

determining if said data packet was accurately received;

acknowledging the accurate receipt of said data packet to the sending node if said data packet is accurately received; and requesting the retransmission of said data packet from the sending node if said data packet was not accurately received.

4. The method of claim 3 wherein said acknowledging step comprises toggling a sequence bit in a returning packet occupying the same transmission slot as the received packet.

5. The method of claim 1 further comprising the step of maintaining a status table for packet transmission slots between adjacent node.

6. The method of claim 5 further comprising the step of deleting an entry from said common buffer pool when an acknowledgment is received indicating that a data packet has accurately been conveyed to an adjacent node.

7. The method of claim 1 wherein said adjusting the round trip delay stop comprises the step of setting the depth of a shift register in the receive path of a packet exchange.

8. The method of claim 7 further comprising the stop of synchronizing the phase/frequency of the clocks of the interconnect controllers of adjacent nodes.

9. The method of claim 8 wherein said synchronizing step comprises the steps of:

measuring the depth of a FIFO buffer in a node receiving a data packet;

converting the FIFO buffer depth to a corresponding analog signal value;

low pass filtering said corresponding analog signal value to generate a low pass filter output signal:

providing said low pass filter output signal as an input to a voltage controlled oscillator; and adjusting the node's clock according to the output of said voltage controlled oscillator.

10. The method of claim 1 wherein four (4) consecutive data packets are conveyed to transmit blocks of information data.

11. The method of claim 10 further comprising the step of providing information control bits to a data packet to indicate that four transmission packets are being utilized to convey a block of data.

12. The method of claim 1 further comprising the steps of:

counting the number of transactions pending for each communications channel in a node; and routing a packet through the communications channel having the least pending traffic of those communications channels coupled to nodes in the shortest path to a given packet's destination.

13. The method of claim 1 further comprising the steps of:

maintaining an age field in each data packet;

incrementing the age field of a data packet each time the data packet is reject;

returning a data packet to its source node when said age field is saturated.

14. The method of claim 1 wherein said storing step comprising the step of storing said data packets in said common buffer pool comprises storing said data packets in W/N bits at a time in banks W/N bits wide in said common buffer pool wherein N is an integer and W/N is an integer.

15. The method of claim 14 wherein W is 80 bits and N is 5 banks whereby W/N is 16 bits/bank.

16. The method of claim 1 further comprising the step of remotely setting the clock of a receiving node by propagating to it a control packet from a remote node.

17. The method of claim 1 further comprising the step of waking up a sleeping node after a predetermined amount of time to allow remote access to said sleeping node.

18. The method of claim 1 wherein said queuing of said selection to said appropriate communications channel includes the step of determining the priority of said selection and routing higher priority selections to a high priority channel.

19. The method of claim 1 wherein said isochronous coupled communications channels form a loop between said adjacent nodes.

20. An interconnect controller for use in a first node in an arbitrary topology collection of nodes for controlling point-to-point data packet exchanges between said first node and adjacent nodes, said data packets having a length of (W) bits, said interconnect controller comprising:

a plurality of communications ports comprising at least first and second communications ports for receiving and conveying said data packets between said first node and said adjacent nodes, said first and second communications ports comprising serial ports for conveying and receiving data packets one bit at a time, said data packets comprising (W) bits plus (X) control information bits wherein the packet transmission time for launching a packet of W+X bits from one of said serial ports to an adjacent interconnect controller requires a time (T);

a plurality of channel modules each coupled to one of said plurality of communications ports, respectively, for controlling the flow of said data packets into and out of said interconnect controller wherein each of said channel modules may be coupled to a channel module of an adjacent node through interconnect controllers implemented in said adjacent nodes, said coupled channel modules of two adjacent nodes continuously exchanging a flow of data packets through an isochronous communications channel;

timing control logic means incorporated in each of said plurality of channel modules for adjusting the round trip delay ($D_{ij}$) of packets exchanged between coupled adjacent channel modules to equal an integral number of T transmission times where $D_{ij}$ is the round trip time for a data packet to travel from a node i to a node j and back to node i;

a common buffer pool coupled to said plurality of channel modules for buffering incoming and outgoing data packets; and routing table logic in communication with said common buffer pool said routing table logic generating indexes for incoming data packets, said indexes used to select appropriate channel modules for routing data packets.

21. The interconnect controller of claim 20 wherein said timing control logic means comprise a shift register through which received data packets pass, said shift register having a variable depth which is set to adjust the round trip delay ($D_{ij}$) for packets exchanged between adjacent channel modules to be an integral multiple of packet transmission time (T).

22. The interconnect controller of claim 21 further comprising a clock means and means for synchronizing said clock means with the clock means incorporated into the interconnect controllers of adjacent nodes.

23. An interconnect controller for use in a first node in an arbitrary topology collection of nodes for controlling point-to-point data packet exchanges between said first node and adjacent nodes, said data packets having a length of (W) bits, said interconnect controller comprising:

a plurality of communications ports comprising at least first and second communications ports for receiving and conveying said data packets between said first node and said adjacent nodes;

a plurality of channel modules each coupled to one of said plurality of communications ports, respectively, for controlling the flow of said data packets into and out of said interconnect controller wherein each of said channel modules may be coupled to a channel module of an adjacent node through interconnect controllers implemented in said adjacent nodes, said coupled channel modules of two adjacent nodes continuously exchanging a flow of data packets by transmitting a data packet upon receiving another data packet through an isochronous communications channel;

a common buffer pool coupled to said plurality of channel modules for buffering incoming and outgoing data packets said common buffer pool comprising a multi-port register file subdivided into (B) banks wherein data packets can be inserted and removed in sub-part quantities of W/B bits;

packet buffer control logic means coupled to said common buffer pool for providing linked list pointers for all stored data packets in said common buffer pool register file; and routing table logic in communication with said common buffer pool and said plurality of channel modules for routing data packets through appropriate channel modules.

24. The interconnect controller of claim 23 wherein said plurality of channel modules each comprise packet state table means for maintaining status information about each packet slot being exchanged between coupled adjacent channel modules.

25. The interconnect controller of claim 24 wherein said packet state table means further comprises means coupled to said common buffer pool for signaling said common buffer pool to erase entries which have been successfully propagated to an adjacent node.

26. The interconnect controller of claim 25 wherein each of said plurality of channel modules further comprise check code generation means for generating check code bits to be appended to data packets prior to the conveyance of said data packets to an adjacent channel module.

27. The interconnect controller of claim 26 wherein each of said plurality of channel modules comprises check code checking logic for verifying the integrity of received data packets by extracting and interpreting said check code bits.

28. The interconnect controller of claim 23 wherein said packet buffer control logic maintains a plurality of link lists for each of said channel modules.

29. The interconnect controller of claim 23 wherein said common buffer pool includes at leas three ports for receiving and transmitting data.

30. The interconnect controller of claim 23 wherein higher priority data packets are transmitted on a high priority channel and lower priority data packets are transmitted on a lower priority channel.

31. The interconnect controller of claim 23 wherein said banks allows simultaneous reading and writing of files from multiple ports in said common buffer pool.

32. The interconnect controller of claim 23 wherein said isochronous communications channel forms a loop carrying data packets from said first node to one of said adjacent nodes and back to said first node.

33. A control system for controlling data flow in an arbitrary topology collection of nodes and interconnect controllers, said control system comprising:

a plurality of communications ports comprising at least a first and a second communications ports used to receive and convey data packets between a first node and a second node adjacent to said first node;

a first channel module of said first node coupled to a first communications ports, said first channel module being capable of controlling the flow of said data packets into and out of a first interconnect controller;

a second channel module of said second node, said second channel module being capable of controlling the flow of said data packets into and out of a second interconnect controller; and, an isochronous communications channel coupling said first channel module to said second channel module and adjusting the roundtrip delay to continuously convey data packets between said first channel module and said second channel module;

a common buffer pool coupled to said first channel module and said second channel module for buffering incoming and outgoing data packets, said common buffer pool including a packet buffer control logic; and, a routing logic in communication with said packet buffer control logic. wherein said routing logic is configured to generate a word that indicates which virtual channel is used for an incoming data packet and said packet buffer control logic configured to interpret said word to maintain a linked list index ad to route data packets through appropriate modules.

* * * * *

UNITED STATES PATENT AND TRADEMARK OFFICE
CERTIFICATE OF CORRECTION

PATENT NO.   : 6,081,844
DATED        : June 27, 2000
INVENTOR(S)  : Nowatzyk et al.

It is certified that error appears in the above-identified patent and that said Letters Patent is hereby corrected as shown below:

Column 17,
Line 44, please delete "delay stop" and insert -- delay step --.
Line 46, please delete "comprising the stop of" and insert -- comprising the step of --.

Column 18,
Line 10, please replace "incromenting" with -- incrementing --.

Column 20,
Line 54, please delete "logic." and insert -- logic, --.

Signed and Sealed this

Thirteenth Day of August, 2002

Attest:

JAMES E. ROGAN
Attesting Officer        Director of the United States Patent and Trademark Office